United States Patent
Hirakata et al.

(10) Patent No.: US 10,862,878 B2
(45) Date of Patent: *Dec. 8, 2020

(54) INFORMATION PROCESSING DEVICE, INFORMATION MANAGEMENT METHOD, AND INFORMATION PROCESSING SYSTEM

(71) Applicant: Ricoh Company, Ltd., Tokyo (JP)

(72) Inventors: Satoru Hirakata, Kanagawa (JP); Ryoh Shimomoto, Kanagawa (JP); Shinya Mukasa, Shizuoka (JP); Teruaki Takahashi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/720,352

(22) Filed: Dec. 19, 2019

(65) Prior Publication Data

US 2020/0127990 A1 Apr. 23, 2020

Related U.S. Application Data

(63) Continuation of application No. 16/291,048, filed on Mar. 4, 2019, now Pat. No. 10,554,647, which is a
(Continued)

(30) Foreign Application Priority Data

May 10, 2013 (JP) .................................. 2013-100631
Apr. 24, 2014 (JP) .................................. 2014-089898

(51) Int. Cl.
*H04L 29/06* (2006.01)
*G06F 16/10* (2019.01)
(Continued)

(52) U.S. Cl.
CPC .............. *H04L 63/08* (2013.01); *G06F 16/10* (2019.01); *G06F 21/31* (2013.01);
(Continued)

(58) Field of Classification Search
CPC ... H04L 63/08; H04L 67/1097; H04L 63/105; G06F 21/31; G06F 21/6218; G06F 16/10; G06F 2221/2141
(Continued)

(56) References Cited

U.S. PATENT DOCUMENTS 8,266,192 B2 9/2012 Nemoto et al.
9,251,150 B2 * 2/2016 Hirakata .................. G06F 21/31
(Continued)

FOREIGN PATENT DOCUMENTS

JP 2001-042986 2/2001
JP 2002-91813 3/2002
(Continued)

OTHER PUBLICATIONS

Office Action dated Feb. 6, 2018 issued with respect to the basic Japanese Patent Application No. 2014-089898.
(Continued)

*Primary Examiner* — Kambiz Zand
*Assistant Examiner* — Aubrey H Wyszynski
(74) *Attorney, Agent, or Firm* — IPUSA, PLLC

(57) ABSTRACT

An information processing method includes: storing first authentication information and second authentication information, the first authentication information being information for a user to access a first information processing device, the second authentication information being information for the first information processing device to access a second information processing device; acquiring first index information from the second information processing device based on the second authentication information, wherein the first index information is information regarding a file stored in the second information processing device; and generating a list including the first index information, and second index information, the second index information (Continued)

including information regarding a file stored in the first information processing device and correspond to the first authentication information.

16 Claims, 26 Drawing Sheets

Related U.S. Application Data continuation of application No. 15/876,605, filed on Jan. 22, 2018, now Pat. No. 10,270,751, which is a continuation of application No. 14/980,015, filed on Dec. 2, 2015, now Pat. No. 9,912,652, which is a continuation of application No. 14/272,830, filed on May 8, 2014, now Pat. No. 9,251,150.

(51) Int. Cl.
*H04L 29/08* (2006.01)
*G06F 21/31* (2013.01)
*G06F 21/62* (2013.01)

(52) U.S. Cl.
CPC ........ *G06F 21/6218* (2013.01); *H04L 63/105* (2013.01); *H04L 67/1097* (2013.01); *G06F 2221/2141* (2013.01)

(58) Field of Classification Search
USPC ........................................................... 726/6
See application file for complete search history.

(56) References Cited

U.S. PATENT DOCUMENTS

| | | | |
|---|---|---|---|
| 9,912,652 B2* | 3/2018 | Hirakata | H04L 67/1097 |
| 10,270,751 B2* | 4/2019 | Hirakata | G06F 16/10 |
| 10,554,647 B2* | 2/2020 | Hirakata | G06F 21/6218 |
| 2010/0325199 A1 | 12/2010 | Park et al. | |
| 2012/0215882 A1 | 8/2012 | Goto | |
| 2013/0219476 A1* | 8/2013 | Lin | H04L 9/321 |
| | | | 726/4 |

FOREIGN PATENT DOCUMENTS

| | | |
|---|---|---|
| JP | 2005-173705 | 6/2005 |
| JP | 2006-172086 | 6/2006 |
| JP | 2008-033786 | 2/2008 |
| JP | 2011-003187 | 1/2011 |
| JP | 2011-197939 | 10/2011 |
| JP | 2012-160017 | 8/2012 |
| JP | 2012-194989 | 10/2012 |
| JP | 2013-507668 | 3/2013 |
| JP | 2013-235565 | 11/2013 |
| WO | 2013/154172 | 10/2013 |

OTHER PUBLICATIONS

Japanese Office Action for 2018-231504 dated Nov. 12, 2019.
Office Action dated Apr. 21, 2020 issued with respect to the corresponding Japanese Patent Application No. 2018-231504.
Office Action dated Oct. 27, 2020 issued with respect to the corresponding Japanese Patent Application No. 2018-231504.

* cited by examiner

FIG.6

| AUTHENTICATION INFORMATION OF STORAGE SERVER | | AUTHENTICATION INFORMATION OF CLOUD STORAGE | | |
|---|---|---|---|---|
| LOGIN ID | PASSWORD | CLOUD NAME | LOGIN ID | PASSWORD |
| userA | ******** | CLOUD STORAGE A | user01 | ******** |
| | | CLOUD STORAGE B | user001 | ******** |
| userB | ******** | CLOUD STORAGE B | user02 | ******** |
| | | CLOUD STORAGE C | user002 | ******** |
| | | CLOUD STORAGE D | user02 | ******** |
| userC | ******** | CLOUD STORAGE B | user03 | ******** |

FIG.7

| CLOUD NAME | FILE PATH | FULL-TEXT INFORMATION | UPDATE DATE | PERMISSION | OWNER | GROUP | FILE SIZE |
|---|---|---|---|---|---|---|---|
| CloudA | /userA/doc/invoice/PRINTER BORROW.doc | (INC.)○○... | 2009/11/14 | -rw-r--r-- | userA | ri.co.jp | 33 |
| CloudB | /userC/doc/contract/○○ TRADING COMPANY.doc | ○○TRADING COMPANY... | 2012/07/28 | -rw------- | userC | nts.ri.co.jp | 75 |
| ... | ... | ... | ... | ... | ... | ... | ... |
| SELF-STORAGE | /userA/doc/xxx.doc | xxx... | 2010/04/24 | -rw-r--r-- | userA | ri.co.jp | 21 |

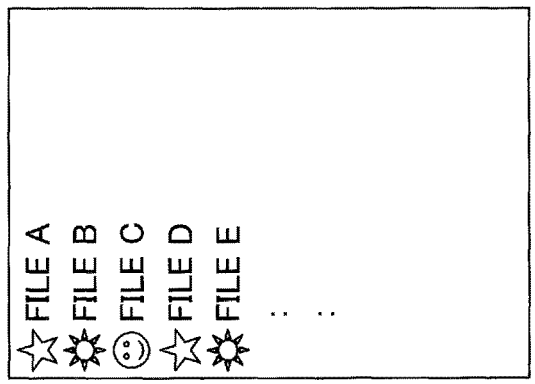
FIG.11D
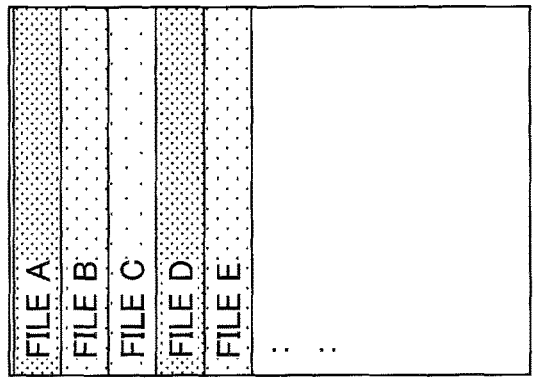
FIG.11C
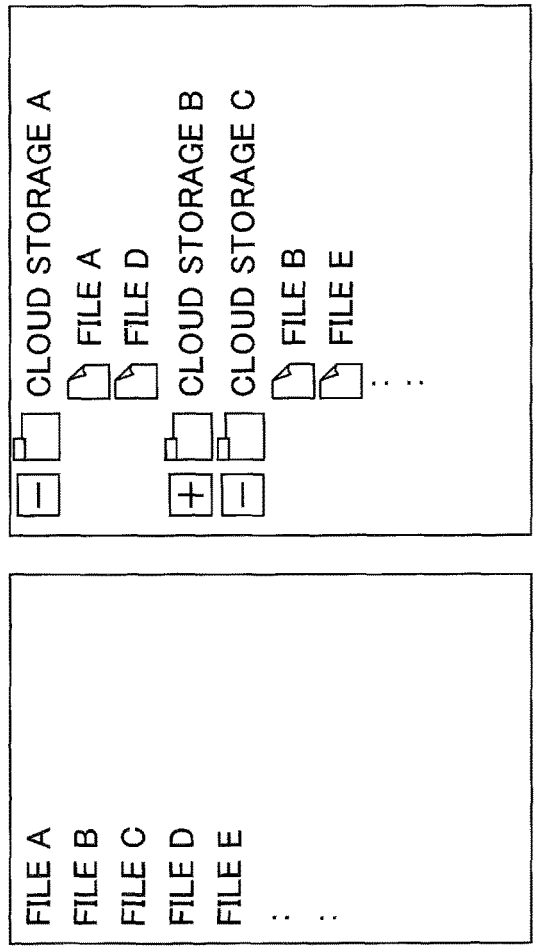
FIG.11B
FIG.11A

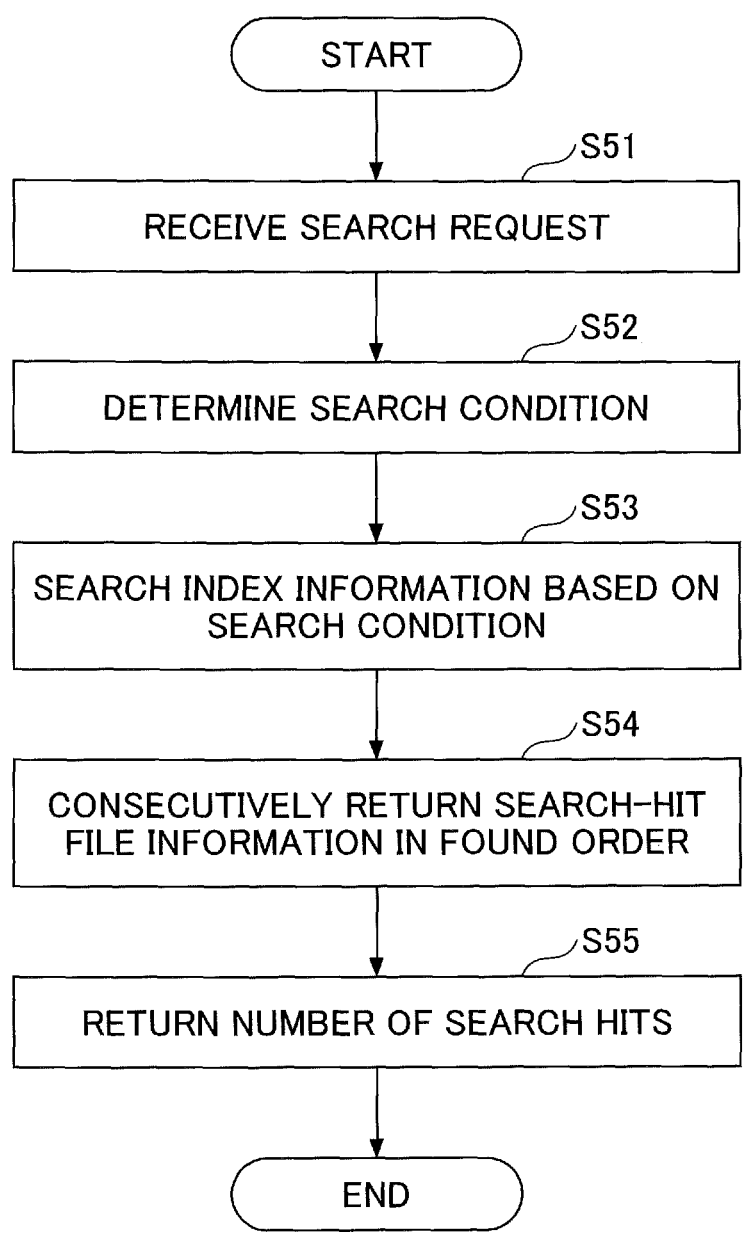

FIG.18

| PRIORITY | COMMUNICATION SPEED | STATE | STORAGE |
|---|---|---|---|
| 1 | 15Mbps | OFFLINE | CLOUD STORAGE-C |
| 2 | 12Mbps | ONLINE | CLOUD STORAGE-D |
| 3 | 9Mbps | ONLINE | CLOUD STORAGE-A |
| 4 | 6Mbps | OFFLINE | CLOUD STORAGE-B |
| 5 | — | ONLINE | SELF-STORAGE |

FIG.19

| PRIORITY | FREE SPACE | STATE | STORAGE |
|---|---|---|---|
| 1 | 1TByte | OFFLINE | CLOUD STORAGE-A |
| 2 | 750GByte | ONLINE | CLOUD STORAGE-C |
| 3 | 500GByte | ONLINE | SELF-STORAGE |
| 4 | 100GByte | OFFLINE | CLOUD STORAGE-B |
| 5 | 50GByte | ONLINE | CLOUD STORAGE-D |

FIG.20

| PRIORITY | KEYWORD | STATE | STORAGE |
|---|---|---|---|
| 1 | FIRST LETTER IS ALPHAMERIC CHARACTER | OFFLINE | CLOUD STORAGE-A |
| 2 | ALL ALPHAMERIC CHARACTERS | ONLINE | CLOUD STORAGE-C |
| 3 | INCLUDE JAPANESE | ONLINE | SELF-STORAGE |
| 4 | INCLUDE "MINUTE" | ONLINE | CLOUD STORAGE-B |
| 5 | ALL OK | OFFLINE | CLOUD STORAGE-D |

FIG.21

| PRIORITY | FILE TYPE | STATE | STORAGE |
|---|---|---|---|
| 1 | OFFICE FILE | OFFLINE | CLOUD STORAGE-A |
| 2 | PDF FILE | ONLINE | CLOUD STORAGE-C |
| 3 | TEXT FILE | ONLINE | CLOUD STORAGE-D |
| 4 | IMAGE FILE | ONLINE | CLOUD STORAGE-B |
| 5 | ALL OK | OFFLINE | SELF-STORAGE |

INFORMATION PROCESSING DEVICE, INFORMATION MANAGEMENT METHOD, AND INFORMATION PROCESSING SYSTEM

CROSS-REFERENCE TO RELATED APPLICATION

This application is a continuation patent application of, and claims the benefit of and priority to U.S. patent application Ser. No. 16/291,048 filed on Mar. 4, 2019 that is a continuation patent application of, and claims the benefit of and priority to U.S. patent application Ser. No. 15/876,605 filed on Jan. 22, 2018 that is a continuation patent application of, and claims the benefit of priority to U.S. patent application Ser. No. 14/980,015 filed on Dec. 28, 2015 which is a continuation patent application of, and claims the benefit of priority to U.S. patent application Ser. No. 14/272,830 filed on May 8, 2014, which is based on and claims priority to Japanese Priority Patent Application No. 2013-100631, filed on May 10, 2013 and Japanese Priority Patent Application No. 2014-089898, filed on Apr. 24, 2014, the entire contents of which are hereby incorporated herein by reference.

BACKGROUND OF THE INVENTION

1. Field of the Invention

The present invention relates to an information processing device, an information management method, and an information processing system.

2. Description of the Related Art

Conventionally, it is known that when a file access request is received from an application, a client determines whether to process the request as a file access request to a local storage of the client, or to process the request as a file access request to a cloud storage (see, for example, Patent Document 1).

There are cases where the user saves information such as files in an external storage such as a cloud storage. However, when the user uses the information such as files saved in the external storage, the user needs to perform operations in accordance with the external storage that is the save location, and therefore the operations become troublesome.

Patent Document 1: Japanese Laid-Open Patent Publication No. 2011-3187

SUMMARY OF THE INVENTION

The present invention provides an information processing device, an information management method, and an information processing system, in which one or more of the above-described disadvantages are eliminated.

According to an aspect of the present invention, there is provided an information processing method, including: storing first authentication information and second authentication information, the first authentication information being information for a user to access a first information processing device, the second authentication information being information for the first information processing device to access a second information processing device; acquiring first index information from the second information processing device based on the second authentication information, wherein the first index information is information regarding a file stored in the second information processing device; and generating a list including the first index information, and second index information, said second index information including information regarding a file stored in the first information processing device and correspond to the first authentication information.

According to an aspect of the present invention, there is provided an information processing device, including: a processor configured to: store first authentication information and second authentication information, the first authentication information being information for a user to access the information processing device, the second authentication information being information for the information processing device to access a second information processing device; acquire first index information from the second information processing device based on the second authentication information, wherein the first index information is information regarding a file stored in the second information processing device; and generate a list including the first index information, and second index information, said second index information including information regarding a file stored in the information processing device and correspond to the first authentication information.

According to an aspect of the present invention, there is provided An information processing system, including: a first information processing device, and a second information processing device including a cloud storage, said first information processing apparatus including: a processor configured to: store first authentication information and second authentication information, the first authentication information being information for a user to access the first information processing device, the second authentication information being information for the first information processing device to access the second information processing device; acquire first index information from the second information processing device based on the second authentication information, wherein the first index information is information regarding a file stored in the second information processing device; and generate a list including the first index information, and second index information, said second index information including information regarding a file stored in the first information processing apparatus and correspond to the first authentication information.

BRIEF DESCRIPTION OF THE DRAWINGS

Other objects, features and advantages of the present invention will become more apparent from the following detailed description when read in conjunction with the accompanying drawings, in which:

FIG. 6 is a configuration diagram of an example of authentication information;

FIG. 7 is a configuration diagram of an example of index information;

FIGS. 11A through 11D are image diagrams of examples of displayed file lists;

FIG. 12 is a flowchart of an example of search processing procedures of the storage server according to the present embodiment;

FIG. 18 is a configuration diagram of an example of cloud information used when selecting the upload destination of the data according to the communication speed;

FIG. 19 is a configuration diagram of an example of cloud information used when selecting the upload destination of the data according to the free space;

FIG. 20 is a configuration diagram of an example of cloud information used when selecting the upload destination of the data according to a keyword included in the file name;

FIG. 21 is a configuration diagram of an example of cloud information used when selecting the upload destination of the data according to the type of file;

DETAILED DESCRIPTION OF THE PREFERRED EMBODIMENTS

A description is given, with reference to the accompanying drawings, of embodiments of the present invention.

First Embodiment

System Configuration

Figure 1:
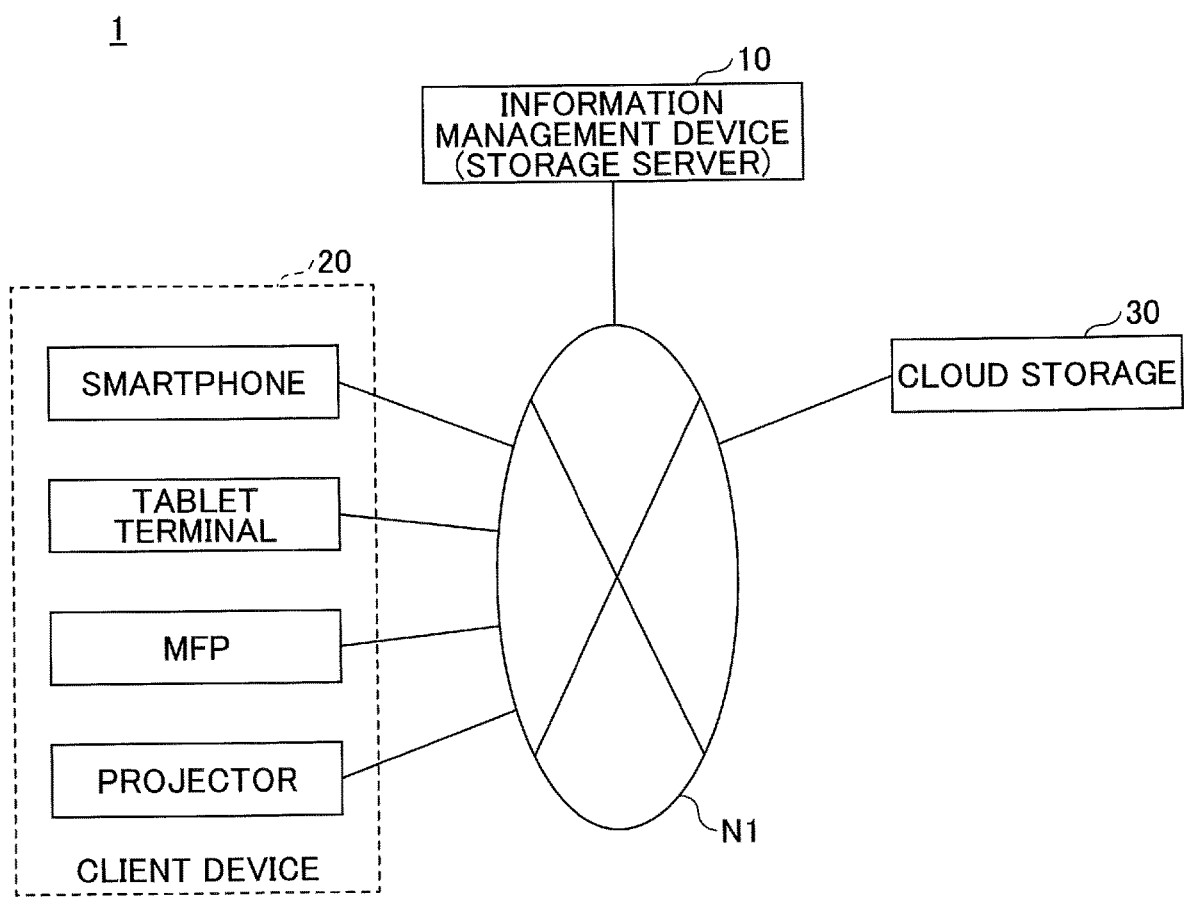
FIG. 1 is a configuration diagram of an example of an information processing system according to the present embodiment.

FIG. 1 is a configuration diagram of an example of an information processing system according to the present embodiment. In an information processing system 1 illustrated in FIG. 1, an information management device 10 is connected to a network N1 such as LAN (Local Area Network). Furthermore, in the information processing system 1, a client device 20 and a cloud storage 30 are connected to the network N1.

The cloud storage 30 is a service by which information such as files can be saved in a server in the network N1. The cloud storage 30 receives an operation to a saved file, etc., from the client device 20 that can be connected to the network N1. The client device 20 is an operation terminal such as a smartphone and a tablet terminal, or an electronic device such as a multifunction peripheral (MFP) and a projector. The user performs an operation on the file, etc., saved in the cloud storage 30, from the client device 20. The client device 20 accesses the cloud storage 30 via the information management device 10.

The information management device 10 is realized by a storage server, etc. The information management device 10 mediates the access and operations from the client device 20 to the cloud storage 30, between the client device 20 and the cloud storage 30.

The information processing system 1 makes it possible to operate a file, etc., without having the user consider the save location, by having the information management device 10 relay the operations (downloading and uploading files, searching) from the client device 20 to the cloud storage 30.

The operation terminal is to be a terminal device that the user can operate, such as a mobile phone and a notebook PC, other than a smartphone and a tablet terminal. The MFP and projector are examples of an electronic device for inputting and outputting (for example, printing, scanning, and projecting) electronic data. Other examples of the electronic device for inputting and outputting electronic data are a digital camera, a microphone, and a speaker. The electronic device may be any device for inputting and outputting electronic data, such as a printer, a scanner, a copier, and an image displaying device, other than an MFP and a projector.

The MFP is an example of an image forming device. The MFP has an imaging function, an image forming function, and a communication function, and may be used as a printer, a fax machine, a scanner, and a copier. The MFP can print out image data. The MFP is an image scanning device for scanning an original document and generating image data. Furthermore, the MFP has a web browser function. The projector is an example of an image projecting device. The projector has a projecting function and a communication function. The projector displays image data.

The information management device 10 is an example of an information processing device. The information management device 10 may execute a high function process that the client device 20 cannot process, and may execute a process as a storage server. The information management device 10 may cooperate with an operation terminal such as a smartphone and a tablet terminal and provide, as a service, the inputting and outputting of electronic data by an electronic device such as an MFP and a projector.

Note that the information management device 10 may be constituted by being distributed among a plurality of computers. Furthermore, there may be a plurality of the cloud storages 30 illustrated in FIG. 1. The cloud storage 30 may be another information management device 10. There may be a plurality of smartphones included in the client device 20.

Hardware Configuration

Figure 2:
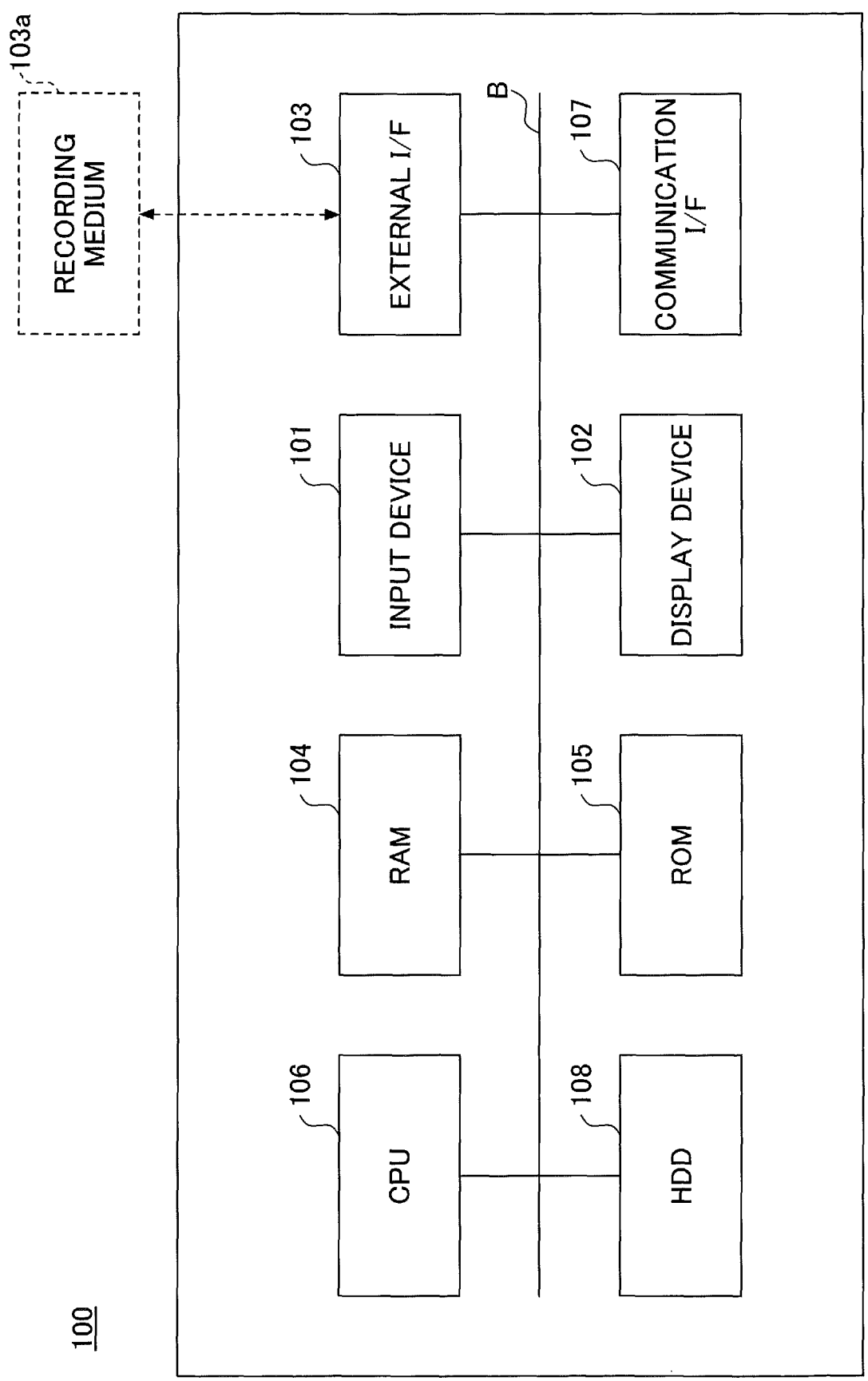
FIG. 2 is a hardware configuration diagram of an example of a computer system according to the present embodiment.

The information management device 10 is realized by, for example, a computer system having a hardware configuration as illustrated in FIG. 2. Note that the operation terminal, such as a smartphone and a tablet terminal, also has a configuration including the hardware configuration illustrated in FIG. 2. FIG. 2 is a hardware configuration diagram of an example of a computer system according to the present embodiment.

A computer system 100 illustrated in FIG. 2 includes an input device 101, a display device 102, an external I/F 103, a RAM 104, a ROM 105, a CPU 106, a communication I/F 107, and a HDD 108, which are interconnected by a bus B. The input device 101 includes a keyboard and a mouse, and is used for inputting various operation signals in the computer system 100.

The display device 102 includes a display, and displays processing results performed by the computer system 100. The communication I/F 107 is an interface for connecting the computer system 100 to the network N1. Accordingly, the computer system 100 can perform data communication with the client device 20 and the cloud storage 30, via the communication I/F 107.

The HDD 108 is a non-volatile storage device storing programs and data. The stored programs and data include an OS (Operating System) that is the basic software for controlling the entire computer system 100, and application programs for providing various functions on the OS. The HDD 108 manages the stored programs and data by a predetermined file system and/or a database (DB).

The external I/F 103 is an interface to an external device. An example of an external device is a recording medium 103a. Accordingly, the computer system 100 can perform reading and/or writing of data on the recording medium 103a via the external I/F 103. Note that examples of the recording medium 103a are a flexible disk, a CD, a DVD (Digital Versatile Disk), an SD memory card, and a USB (Universal Serial Bus) memory.

The ROM 105 is a non-volatile semiconductor memory (storage device), by which programs and data can be saved even after the power is turned off. The ROM 105 stores programs and data such as BIOS (Basic Input/Output System) that is executed when the computer system 100 is activated, OS settings, and network settings. The RAM 104 is a volatile semiconductor memory (storage device) for temporarily storing programs and data.

The CPU 106 is a processor for implementing control and functions of the entire computer system 100, by loading programs and data into the RAM 104 from storage devices such as the ROM 105 and the HDD 108, and executing processes.

The computer system 100 according to the present embodiment can realize various processes described below, by the cooperation of hardware resources and programs, according to a combination of the hardware resources, programs, and data described above.

Software Configuration

In the following, a description is given of the information processing system 1 in which the information management device 10 is realized by a storage server 10A. Furthermore, in the following, file data is described as an example of information saved in the cloud storage 30. For example, the storage server 10A according to the present embodiment is realized by processing blocks as illustrated in FIG. 3.

Figure 3:
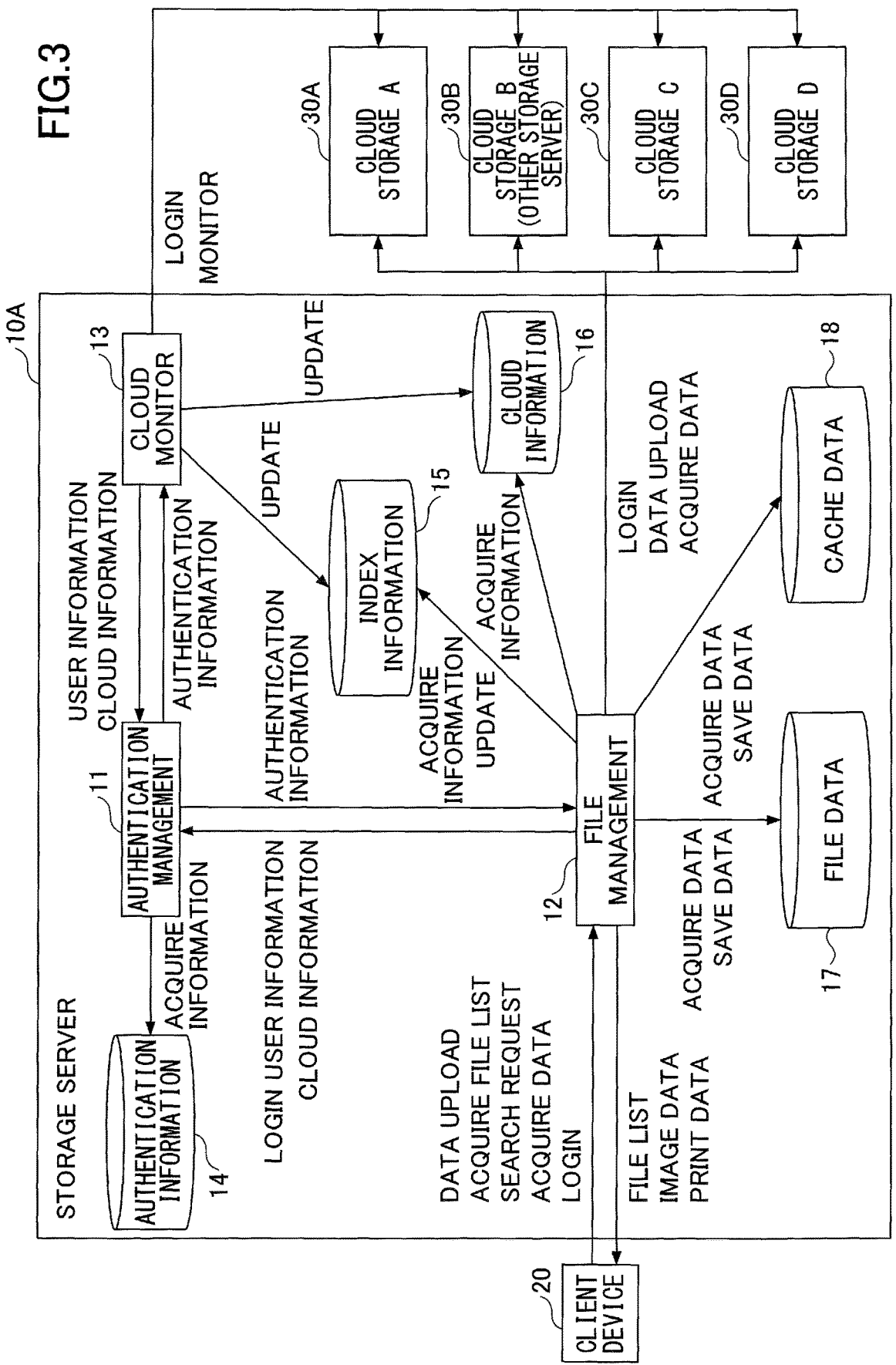
FIG. 3 is a processing block diagram of an example of a storage server according to the present embodiment.

FIG. 3 is a processing block diagram of an example of a storage server according to the present embodiment. The storage server 10A executes programs to realize an authentication management unit 11, a file management unit 12, a cloud monitor unit 13, an authentication information saving unit 14, an index information saving unit 15, a cloud information saving unit 16, a file data saving unit 17, and a cache data saving unit 18.

The authentication management unit 11 manages authentication information used for the client device 20 to access the storage server 10A, and authentication information used for the storage server 10A to access the cloud storages 30A through 30D. The file management unit 12 uses index information of the file data saved in the cloud storages 30A through 30D, to manage the file data saved in the cloud storages 30A through 30D. The cloud monitor unit 13 monitors the state of the cloud storages 30A through 30D, and updates the index information and cloud information.

The authentication information saving unit 14 saves authentication information used for the client device 20 to access the storage server 10A, and authentication information used for the storage server 10A to access the cloud storages 30A through 30D. The index information saving unit 15 saves the index information of the file data saved in the cloud storages 30A through 30D.

The cloud information saving unit 16 saves the cloud information described below. The file data saving unit 17 saves the file data in the storage server 10A. Note that the file management unit 12 uses the index information of the file data saved in the file data saving unit 17, to set the file data saved in the file data saving unit 17 as a target of management as well. The cache data saving unit 18 saves the cache.

Details of Process

In the following, a description is given of details of processes of the information processing system 1 according to the present embodiment.

Login Process

Figure 4:
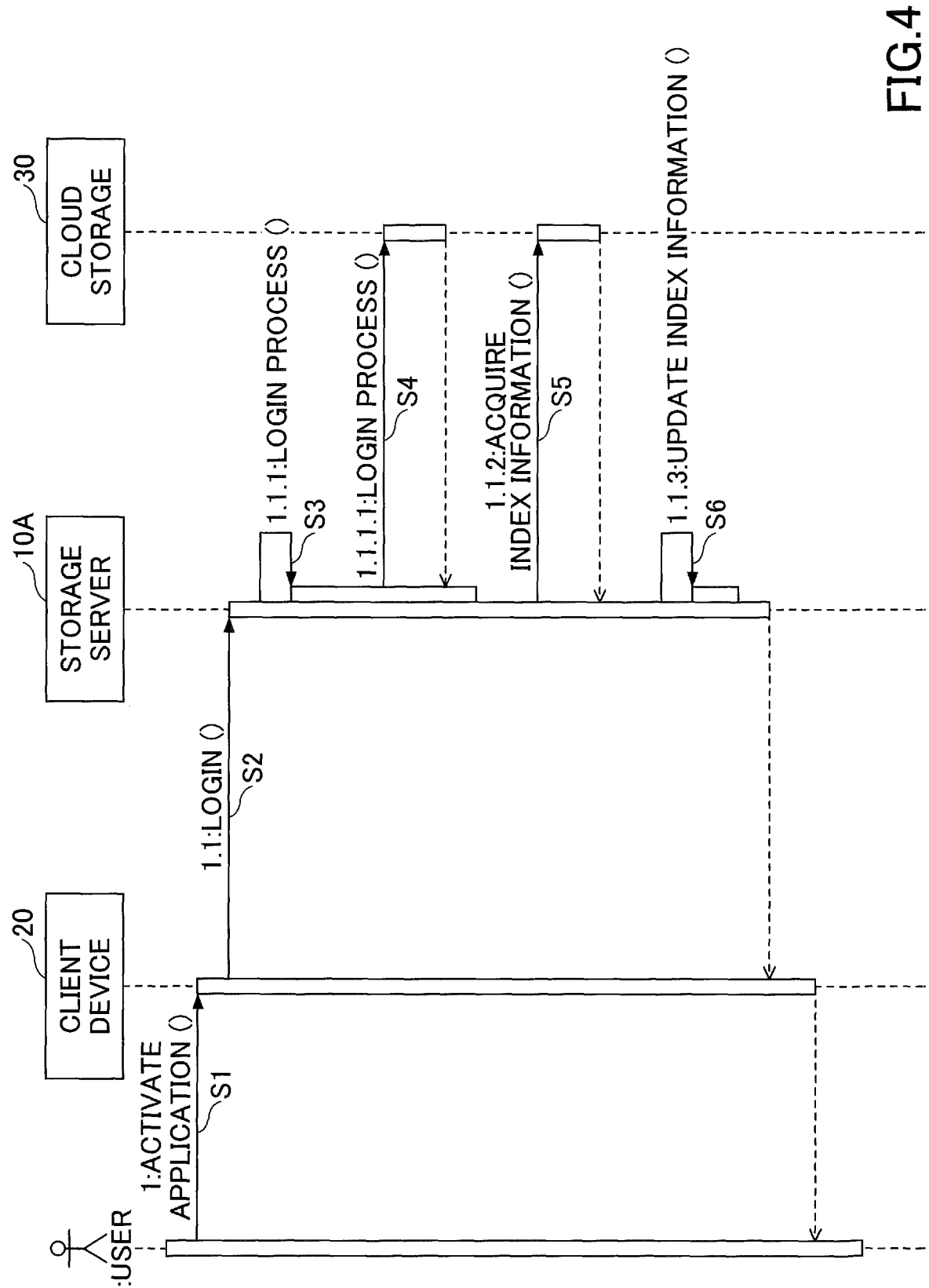
FIG. 4 is a sequence diagram of an example expressing login processing procedures of the information processing system according to the present embodiment.

FIG. 4 is a sequence diagram of an example expressing login processing procedures of the information processing system 1 according to the present embodiment. In step S1, the user activates the application installed in the client device 20. Note that the application may be an application exclusive to the storage server 10A, or a general-purpose application such as a web browser. The user inputs information (user identification information) necessary for login such as a login ID and a password, according to need.

In step S2, the client device 20 requests login to the storage server 10A. In step S3, the storage server 10A executes a login process from the client device 20. When the login from the client device 20 is successful, in step S4, the storage server 10A requests a login process to the cloud storage 30 associated with the user who has logged in.

Furthermore, when the login to the cloud storage 30 is successful, in step S5, the storage server 10A acquires index information from the cloud storage 30. In step S6, the storage server 10A updates the index information saved in the index information saving unit 15 with the use of the acquired index information.

Figure 5:
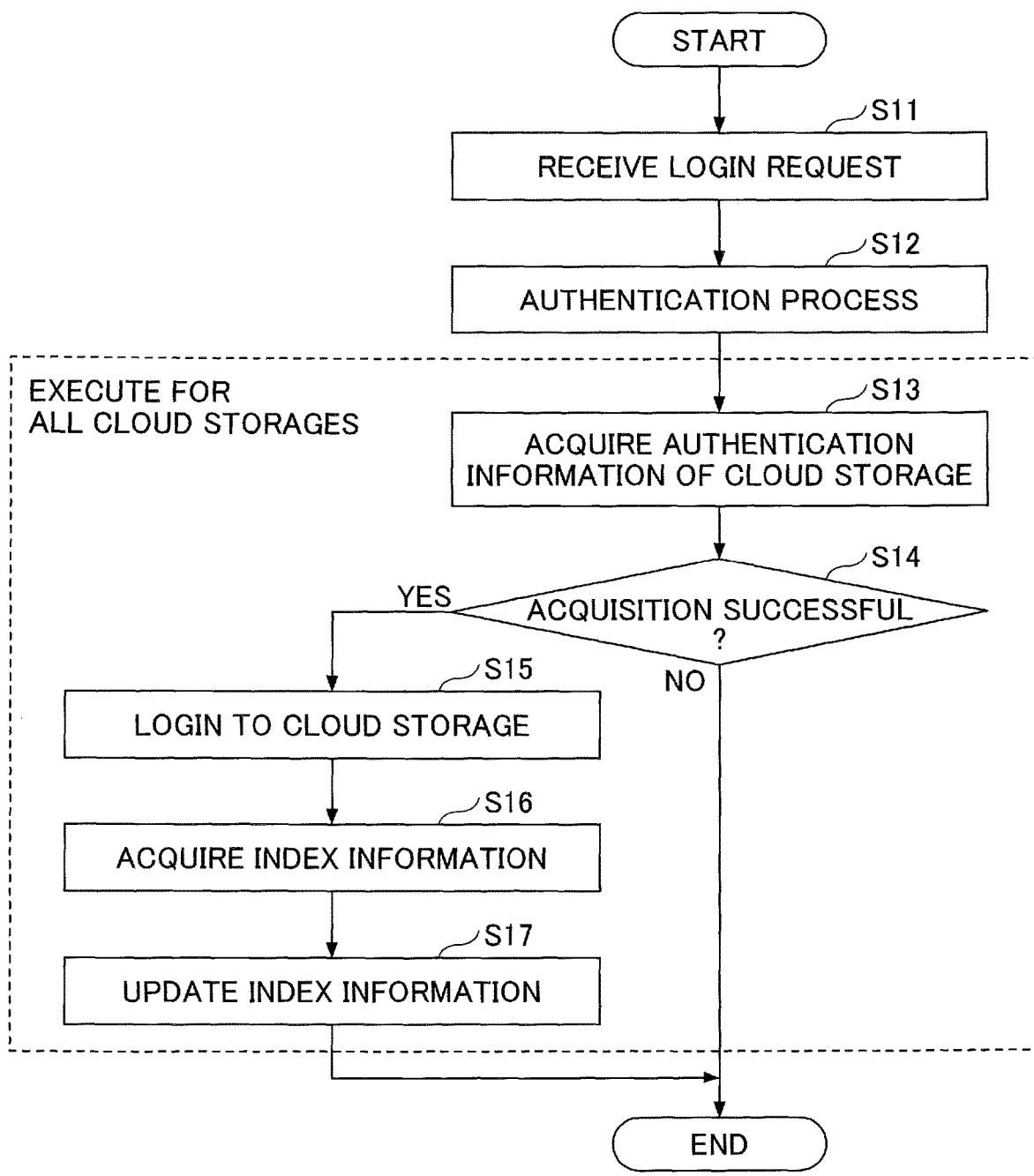
FIG. 5 is a flowchart of an example expressing login processing procedures of a storage server according to the present embodiment.

Furthermore, FIG. 5 is a flowchart of an example expressing login processing procedures of the storage server 10A according to the present embodiment. In step S11, the storage server 10A receives a login request from the client device 20. The login request includes, for example, a login ID and a password as user identification information.

In step S12, based on the login request from the client device 20, the storage server 10A performs an authentication process with the use of the login ID and the password received at the time of the login request and authentication information as illustrated in FIG. 6 saved in the authentication information saving unit 14.

FIG. 6 is a configuration diagram of an example of authentication information. The authentication information illustrated in FIG. 6 includes the authentication information of the storage server 10A and the authentication information of the cloud storage 30. The authentication information of the storage server 10A is authentication information used for the client device 20 to log into the storage server 10A. Furthermore, the authentication information of the cloud storage 30 is authentication information used for the storage server 10A to log into the cloud storage 30.

As the authentication information of the storage server 10A, information of the device such as a device ID may be used, other than the login ID and the password. By associating the information of the device with the login ID and the password, the information of the device may be used as user identification information.

Furthermore, the authentication information of the cloud storage 30 is associated with the authentication information of the storage server 10A. In the authentication information of FIG. 6, authentication information of one or more cloud storages 30 is associated with authentication information of a single storage server 10A. The authentication information of the cloud storage 30 includes a cloud name, a login ID, and a password.

When the login from the client device 20 is successful, in step S13, the storage server 10A acquires, from the authentication information of FIG. 6, the authentication information of the cloud storage 30 associated with the authentication information of the storage server 10A of the user who has logged in.

In step S14, when the storage server 10A successfully acquires the authentication information of the cloud storage 30, the storage server 10A performs the processes of step S15 and onward. In step S15, the storage server 10A uses the acquired authentication information of the cloud storage 30 to request a login process to the cloud storage 30. When the login to the cloud storage 30 is successful, in step S16, the storage server 10A acquires index information from the cloud storage 30. In step S17, the storage server 10A uses the acquired index information to update the index information saved in the index information saving unit 15.

For example, the storage server 10A to which a "user A" has logged in acquires, from the authentication information of FIG. 6, the authentication information of the cloud storages 30 whose cloud names are "cloud storage A" and "cloud storage B". To the cloud storage 30A having a cloud name "cloud storage A", the storage server 10A makes a login request with a login ID "user 01" and a password. Furthermore, to the cloud storage 30B having a cloud name "cloud storage B", the storage server 10A makes a login request with a login ID "user 001" and a password.

FIG. 7 is a configuration diagram of an example of index information. The index information of FIG. 7 includes attribute information such as a cloud name, a file path, full text information, the update date, permission, the owner, the group, and the file size.

Full text information is text information of a document file, when the target file is a document file. Permission is information relevant to the access rights to a file. Permission is described as, for example, "-rw-r--r--", where the first character is information for identifying the type of the target data, such as a file and a directory. The next three characters indicate the access rights of the owner. Among the three characters, the first character "r" indicates reading of the target data (read), the second character "w" indicates writing of the target data (write), and the third character "x" indicates execution of the target data. When the owner cannot execute the respective processes, the position of the target character is indicated by "-". The next three characters, which follow the three characters indicating the access rights of the owner, indicate the access rights of the group of the target data. The three characters, which follow the three characters indicating the access rights of the group, indicate the access rights of another user. Note that the contents indicated by the three characters of the group and another user, are the same as the three characters of the access rights of the owner.

For example, in the case of "-rw-r--r--", the access rights are interpreted as follows. "The target data is a file, the owner can read and right, but cannot execute. The user of the group can read, but cannot write or execute. Another user can read, but cannot write or execute.

Referring back to FIG. 7, the owner and the group indicate the owner and the group described with respect to the permission.

The storage server 10A saves, in advance, the index information for searching as illustrated in FIG. 7, in order to search for a file saved in one or more cloud storages 30 in a cross-sectoral manner. In order to create the index information, the storage server 10A periodically accesses the cloud storage 30 to scan whether there is a file, and updates the attribute information.

When the storage server 10A cannot access the cloud storage 30, in order to increase the search speed, the index information of a file saved in a cloud storage 30 that cannot be accessed, is deleted. In the searching by the storage server 10A, it is possible to specify search refinement and the search order, based on the type of attribute information of the index information.

For example, in the index information of FIG. 7, when the search range is refined to a cloud name "Cloud A", the range of the search by the storage server 10A is refined to files saved in the cloud storage 30A having a cloud name "Cloud A". Furthermore, according to the specification of the search range, the search may be performed in the order of the cloud storage 30A→ the cloud storage 30B→ the cloud storage 30C. Furthermore, the search may be performed from the newest to the oldest update date of the file.

Note that the index information of the cloud name "self-storage" in the index information in FIG. 7 is index information for searching for a file saved in the file data saving unit 17 of the storage server 10A.

Update Process of Index Information

Figure 8:
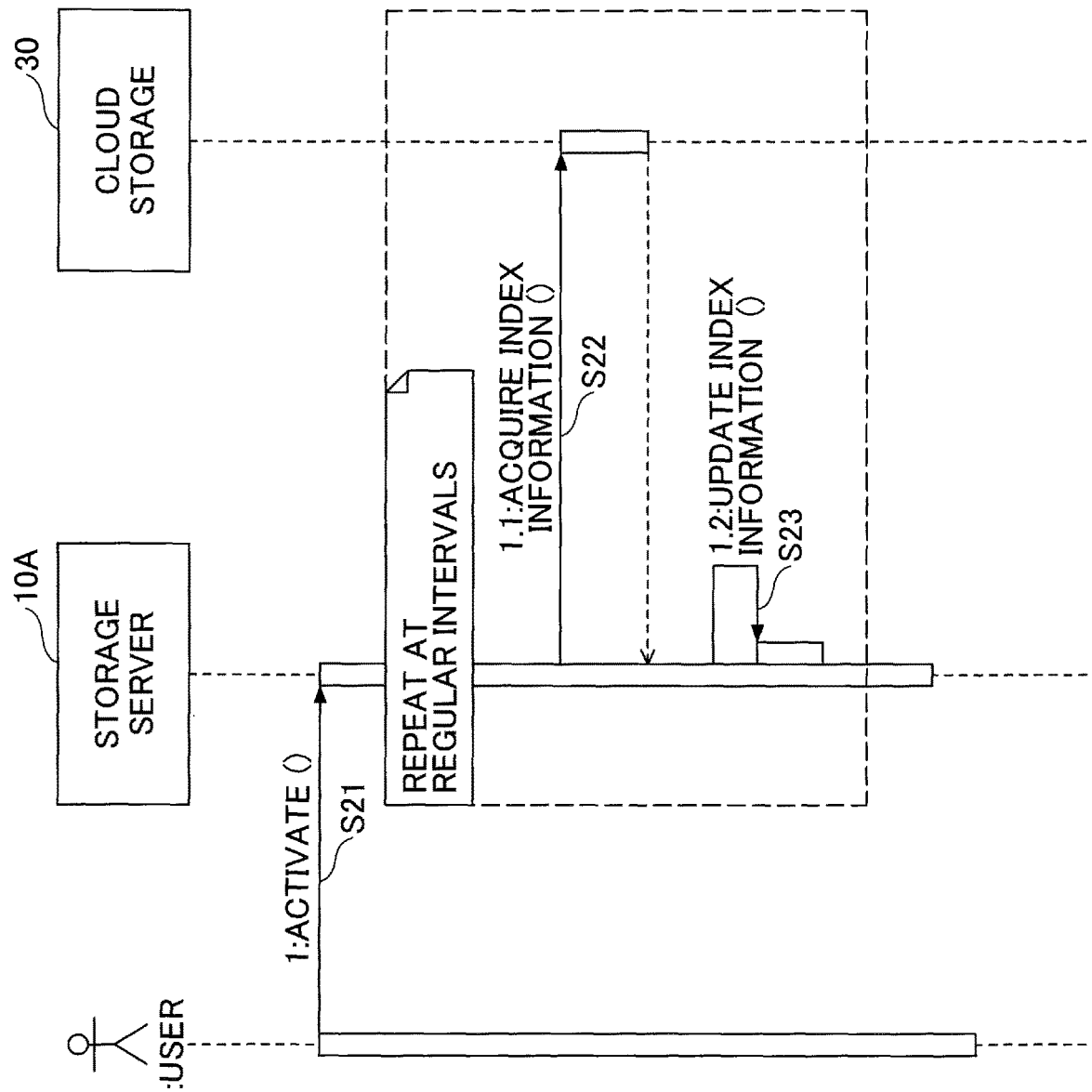
FIG. 8 is a sequence diagram of an example of processing procedures of updating index information performed by the information processing system according to the present embodiment.

The index information may be created and updated at the time of the login process and when registering the authentication information, and may be updated at regular intervals while the storage server 10A is being activated, as illustrated in FIG. 8.

FIG. 8 is a sequence diagram of an example of processing procedures of updating index information performed by the information processing system 1 according to the present embodiment. In step S21, the user activates the storage server 10A. While the storage server 10A is being activated, steps S22 and S23 are repeated at regular intervals.

In step S22, the storage server 10A acquires index information form the cloud storage 30. In step S23, the storage server 10A updates the index information saved in the index information saving unit 15, with the use of the acquired index information.

Process of Displaying File List

Figure 9:
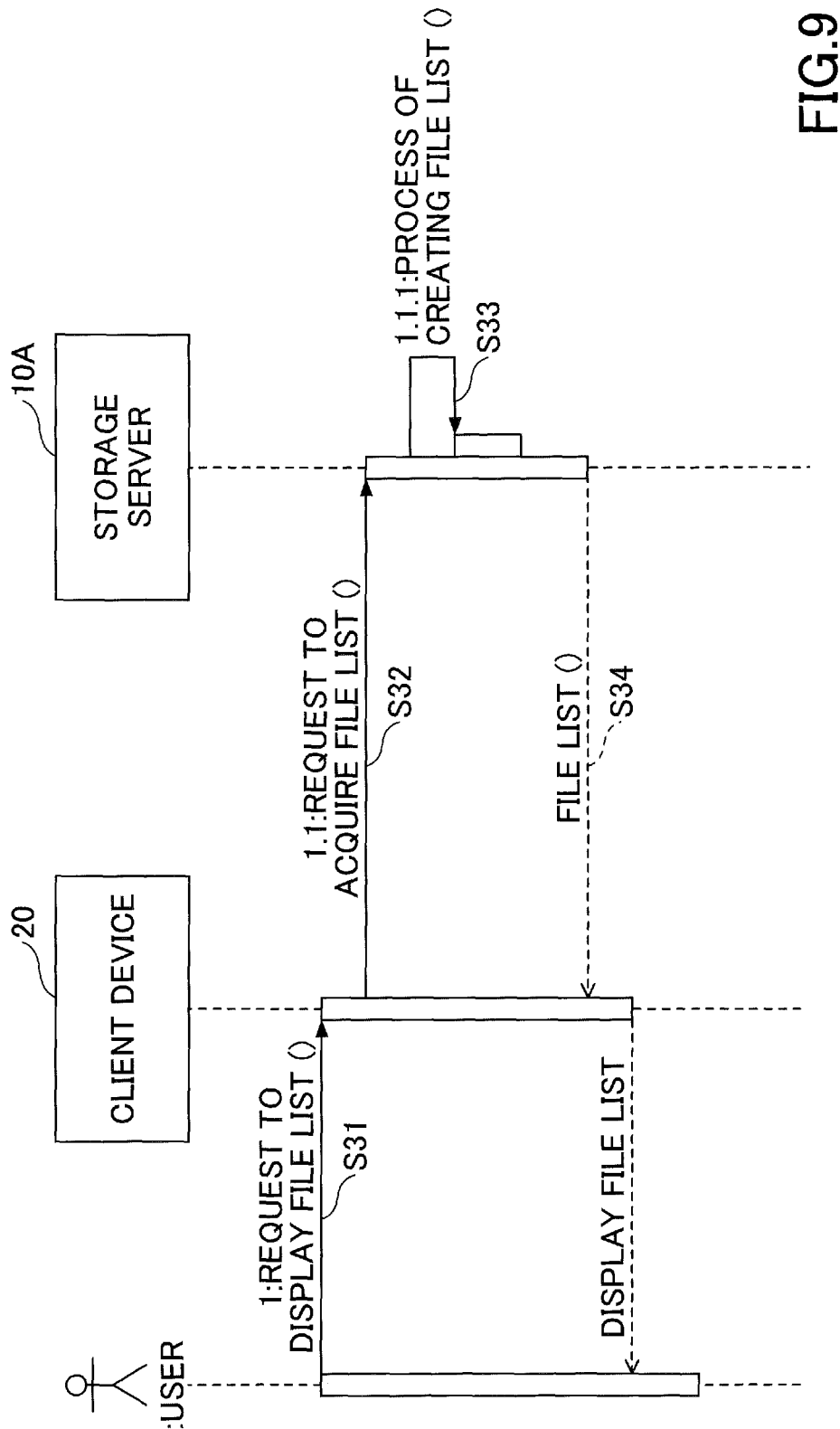
FIG. 9 is a sequence diagram of an example of processing procedures of displaying a file list performed by the information processing system according to the present embodiment.

FIG. 9 is a sequence diagram of an example of processing procedures of displaying a file list performed by the information processing system 1 according to the present embodiment. In step S31, the user operates the client device 20, and requests the display of a file list. In step S32, the client device 20 requests the storage server 10A to acquire the file list. In step S33, the storage server 10A performs a process of creating a file list. Note that details of the process of creating a file list are described below. In step S34, the storage server 10A sends the created file list to the client device 20. The client device 20 displays the received file list. The user can confirm the file list displayed by the client device 20.

Figure 10:
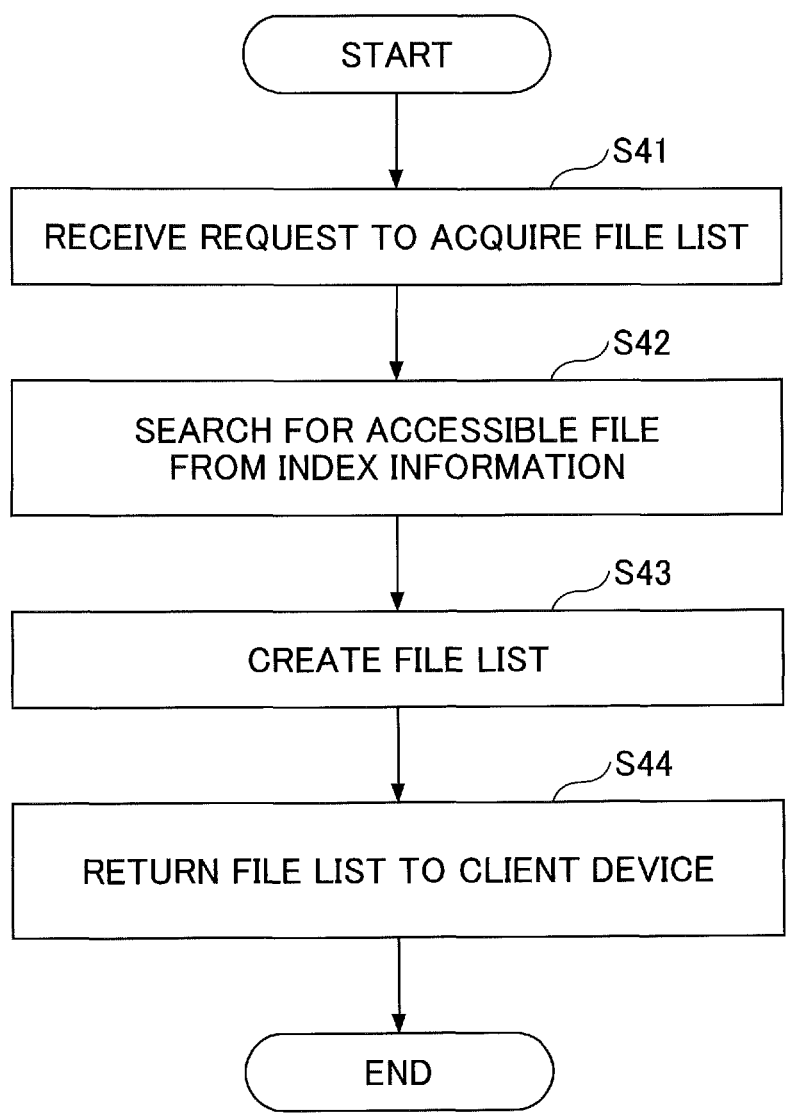
FIG. 10 is a flowchart of an example of processing procedures of creating a file list performed by the storage server according to the present embodiment.

FIG. 10 is a flowchart of an example of processing procedures of creating a file list performed by the storage server 10A according to the present embodiment. In step S41, the storage server 10A receives a request to acquire a file list from the client device 20.

Furthermore, in step S42, the storage server 10A refers to the index information saved in the index information saving unit 15, and searches for a file that a logged in user can access. Note that a file that a logged in user can access may be a file that only the logged in user can access, or a common file that all users can access. The determination of whether access is possible is made based on the permission associated with each data illustrated in FIG. 7.

In step S43, the storage server 10A creates a list of files that are accessible by a logged in user, from the search result of step S42. Then, in step S44, the storage server 10A returns the file list created in step S43, to the client device 20.

The client device 20 that has received the file list displays the file list as illustrated in FIGS. 11A through 11D, for example. FIGS. 11A through 11D are image diagrams of examples of displayed file lists. In the examples of displayed file lists illustrated in FIGS. 11A through 11D, file A and file D are included in a cloud storage A. Furthermore, in the examples in FIGS. 11A through 11D, file C is included in a cloud storage B. Furthermore, in the examples in FIGS. 11A through 11D, file B and file E are included in a cloud storage C.

FIG. 11A illustrates a displayed file list displaying all of the files in parallel. Furthermore, FIG. 11B illustrates a displayed file list in which the files are divided into folders of each of the cloud storages 30 in which the files are saved.

Furthermore, FIG. 11C illustrates a displayed file list displaying all of the files in parallel, which are indicated in different colors according to the cloud storage 30 in which the file is saved. Furthermore, FIG. 11D illustrates a displayed file list displaying all of the files in parallel, which have different icons applied according to the cloud storage 30 in which the file is saved.

Note that when the same file is saved in a plurality of cloud storages 30, the file list may only display one file. It may be determined whether the files are the same file, based on whether the file name matches/does not match. Furthermore, it may be determined whether the files are the same file, based on whether the full-text information included in the index information matches/does not match. Furthermore, it may be determined whether the files are the same file, based on whether both the file name and the full-text information included in the index information match/do not match.

In a case where file A, file B, and file C are included in the "cloud storage A", and file C, file D, and file E are included in the "cloud storage B", the file list is displayed as illustrated in FIG. 11A.

Search Process

The storage server 10A, which has received a search request from the client device 20, executes a search process as illustrated in FIG. 12. FIG. 12 is a flowchart of an example of search processing procedures of the storage server 10A according to the present embodiment.

In step S51, the storage server 10A receives a search request from the client device 20. In step S52, the storage server 10A determines the search condition of the received search request. The storage server 10A holds, as index information, various items of attribute information of files (of self-storage) saved in the file data saving unit 17 and files (of external storages) saved in the cloud storage 30.

Accordingly, in step S53, the storage server 10A can specify search refinement and the search order of the index information, based on the search condition: The storage server 10A searches the index information based on the search condition. In step S54, the storage server 10A consecutively returns the information of the files hit by the search, to the client device 20 that is the search request source. Furthermore, in step S55, the storage server 10A returns the number of hits of the search to the client device 20 that is the search request source.

Note that when the files hit by the search can be downloaded from the cloud storage 30, the storage server 10A may download the files from the cloud storage 30 in the order that they were hit by the search.

Uploading File

Figure 13:
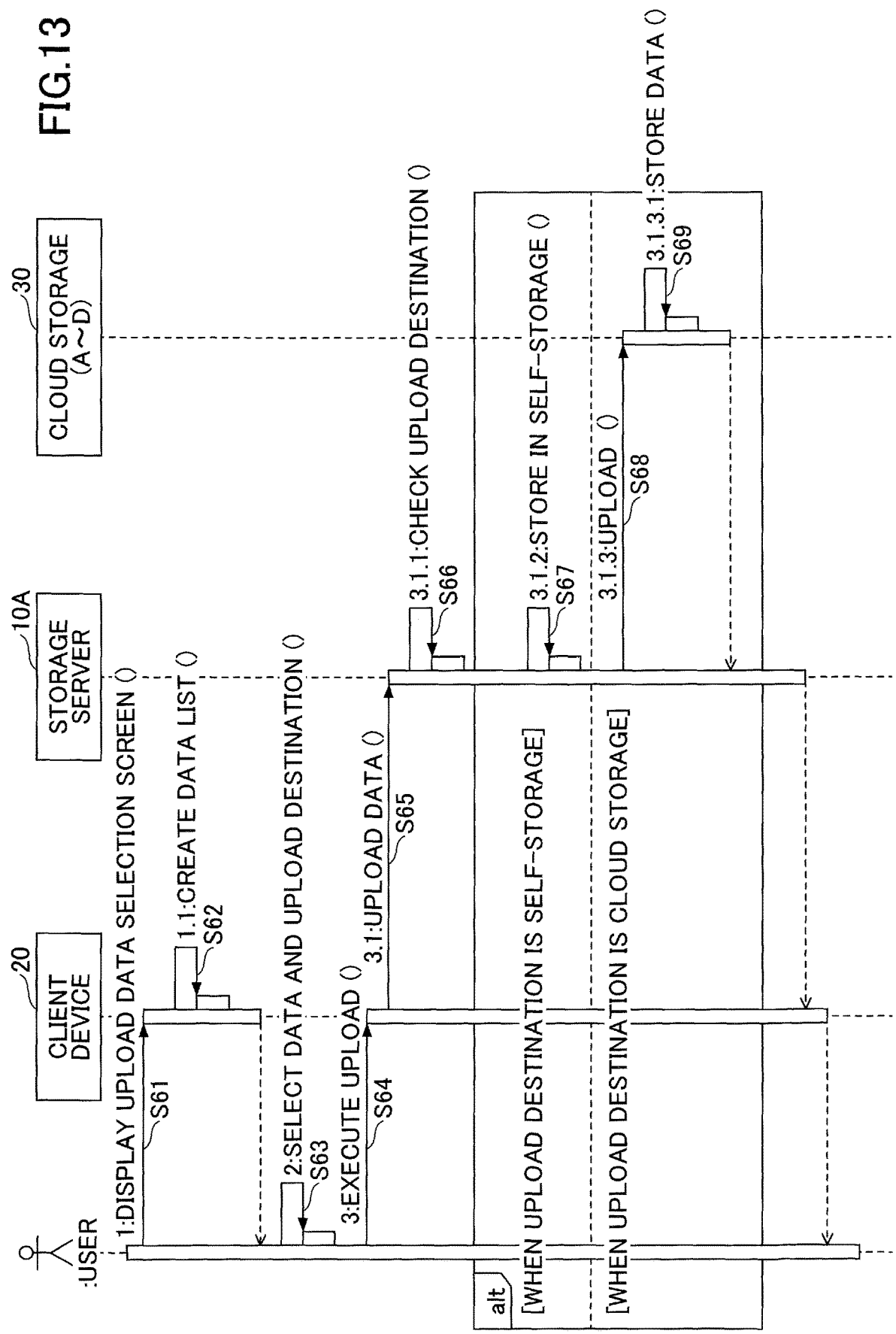
FIG. 13 is a sequence diagram of an example of upload processing procedures of the information processing system according to the present embodiment.

The user may upload a file from the client device 20 as illustrated in FIG. 13. FIG. 13 is a sequence diagram of an example of upload processing procedures of the information processing system 1 according to the present embodiment. Note that FIG. 13 illustrates an upload process in which the upload destination is specified.

Figure 25:
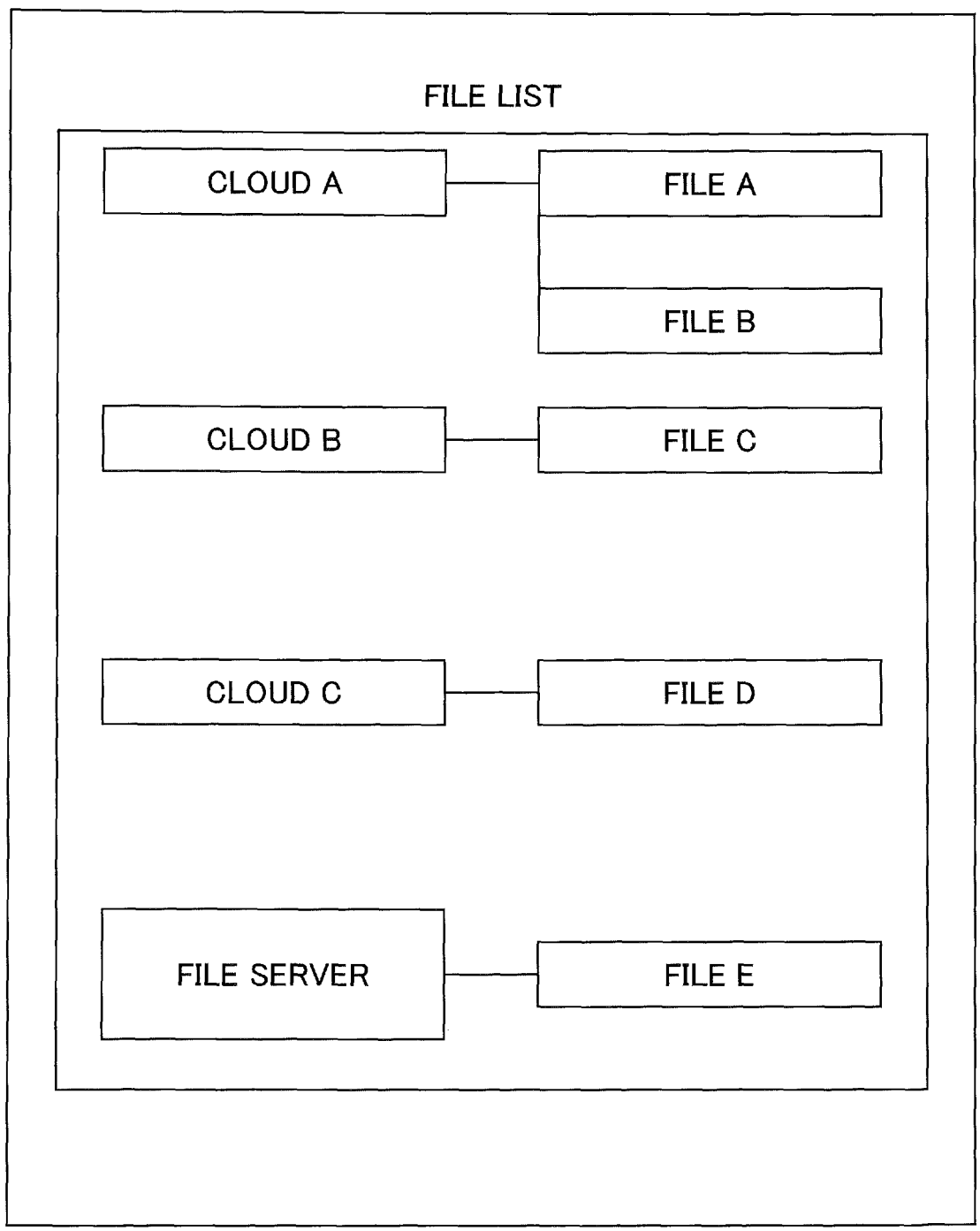
FIG. 25 is an image diagram of another example of a displayed file list.
Figure 26:
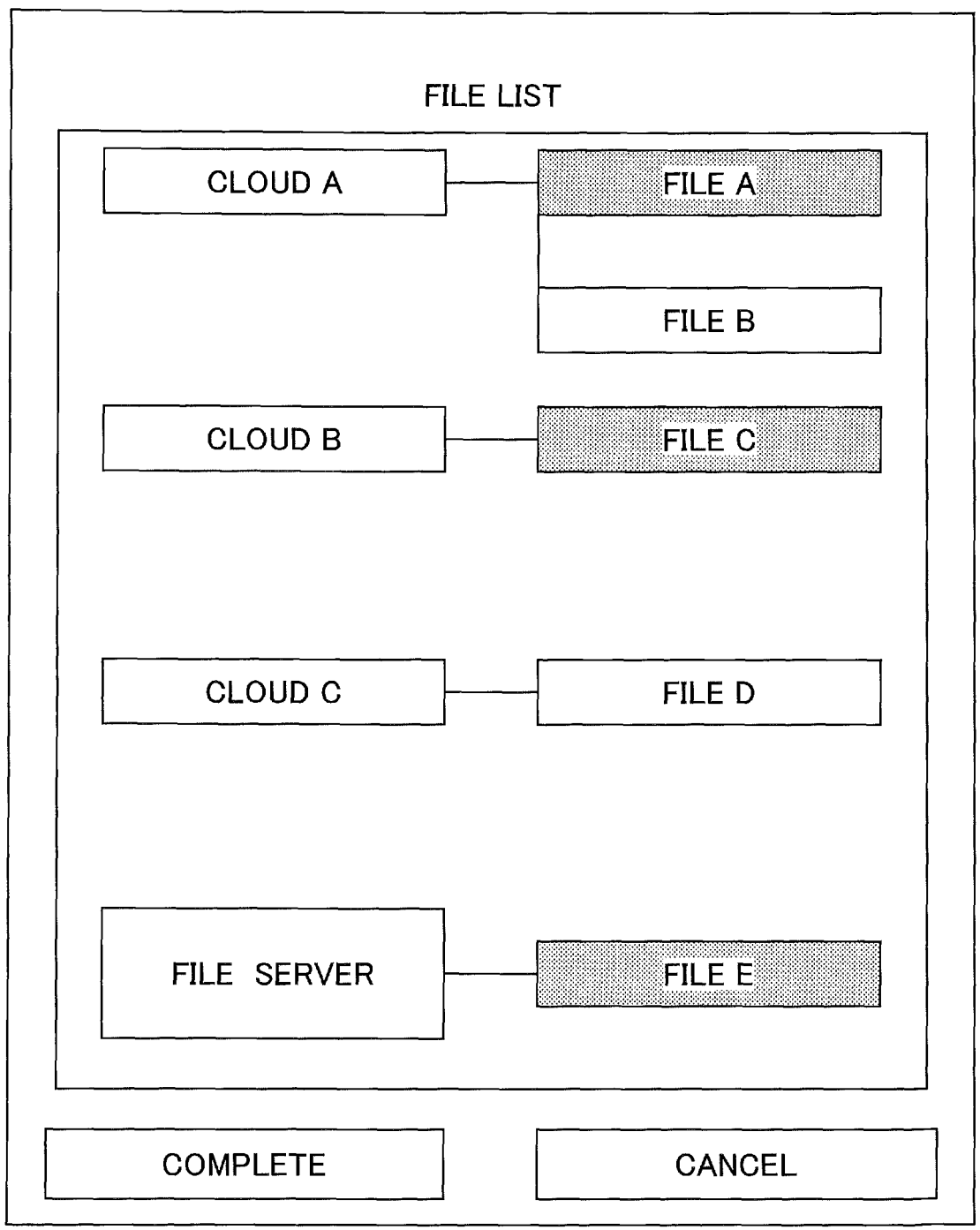
FIG. 26 is an image diagram of an example of a displayed file list in which files are selected.
Figure 27:
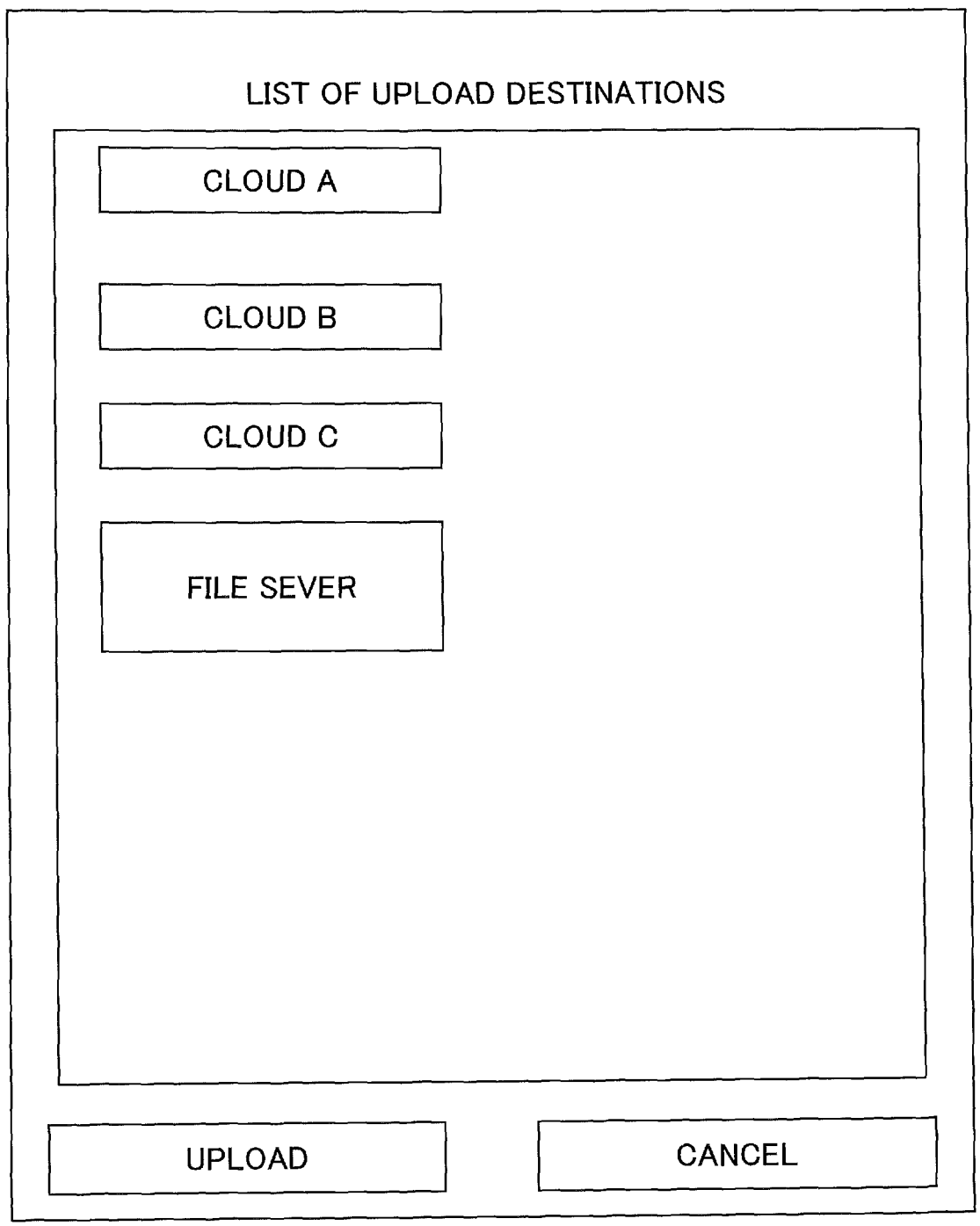
FIG. 27 is an image diagram of an example of a displayed upload destination list.

In step S61, the user operates the client device 20 and requests the display of the upload data selection screen. In step S62, the client device 20 creates a list of data that can be uploaded, and displays a screen as illustrated in FIG. 25. In step S63, the user selects data to be uploaded, from the displayed data list. For example, as illustrated in FIG. 26, it is assumed that a user has selected "file A", "file C", and "file E" from the list, and has selected "complete". Furthermore, the user selects the self-storage or the cloud storage 30, as the upload destination of the data. In step S64, the user requests the client device 20 to execute the uploading. For example, as illustrated in FIG. 27, a list of upload destinations (including self-storage and cloud storage) is displayed on the client device 20, and the user selects the upload destination and selects "upload". Note that at this time, the user may select a plurality of upload destinations.

In step S65, the client device 20 requests the storage server 10A to upload the data, based on the upload execution request from the user. This execution request includes information (for example, identification information for identifying the upload destination) relevant to the upload destination to which the data is to be uploaded. In step S66, the storage server 10A checks the upload destination.

When the upload destination is the self-storage, in step S67, the storage server 10A saves the data selected by the user in the upload destination selected by the user. Furthermore, when the upload destination is the cloud storage 30, in step S68, the storage server 10A requests the cloud storage 30 that is the upload destination to upload the data selected by the user. In step S69, the cloud storage 30 saves the uploaded data.

Note that after the uploading of the data is completed, the storage server 10A can update the index information of the file saved in the cloud storage 30 that is the upload destination. As described above, the storage server 10A can also update the index information at the timing of uploading the file.

Note that the sequence diagram of FIG. 13 is an example of a process in a case where the client device 20 is an operation terminal such as a smartphone and a tablet terminal saving the data to be uploaded.

For example, when the client device 20 is an electronic device such as a scanner that can generate the data to be uploaded, the processes of steps S61 through S64 become processes for generating the data to be uploaded. Furthermore, in the case of a smartphone and a tablet terminal, an image taken by the camera of the operation terminal may be uploaded.

Figure 28:
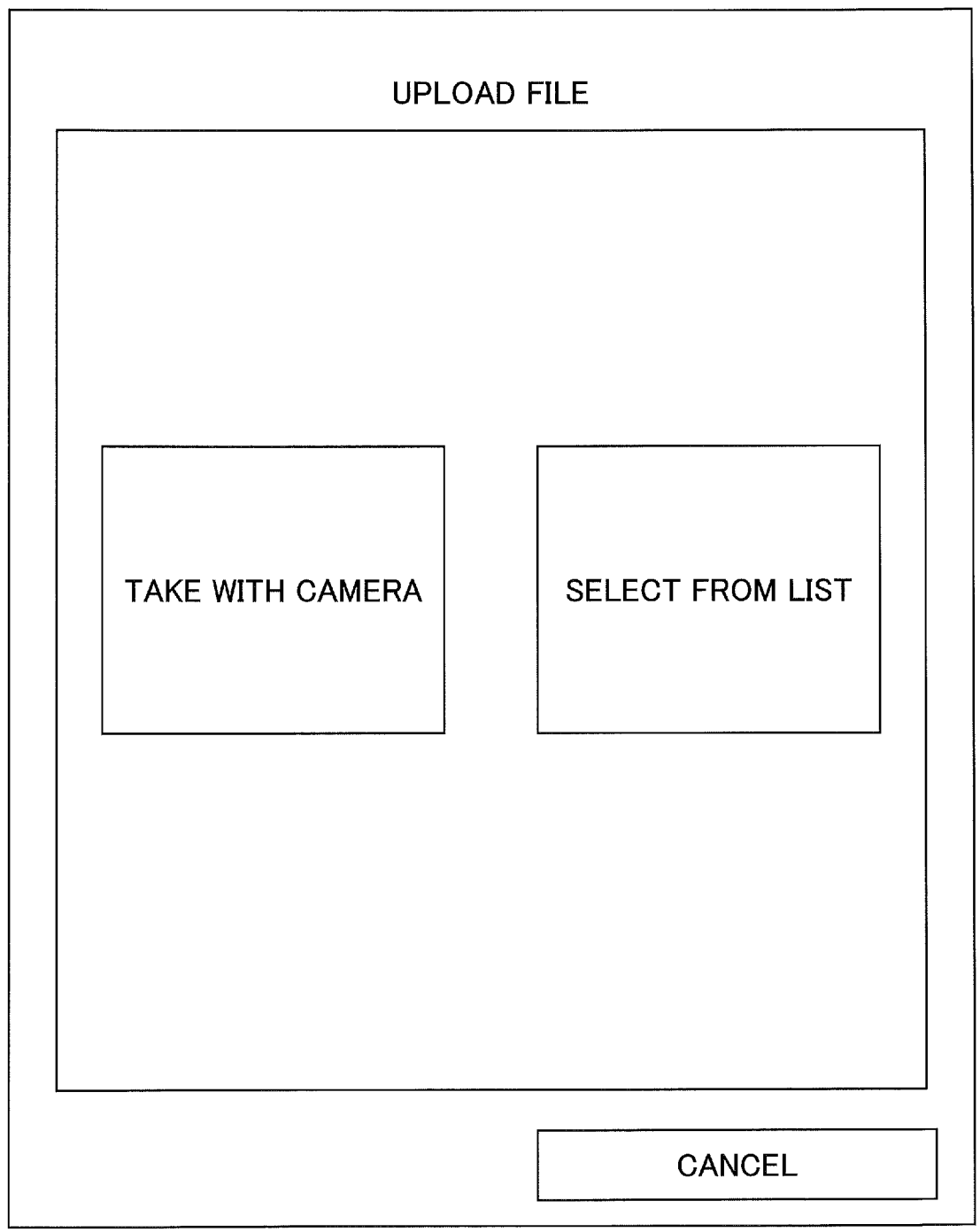
FIG. 28 is an image diagram of an example of a file upload destination selection screen.

Note that when uploading the file, a screen as illustrated in FIG. 28 may be displayed on the client device 20, for letting the user select either to take an image with a camera (generate data to be uploaded and upload the generated data), or select an image from a file list (upload data stored in the client device 20).

Figure 14:
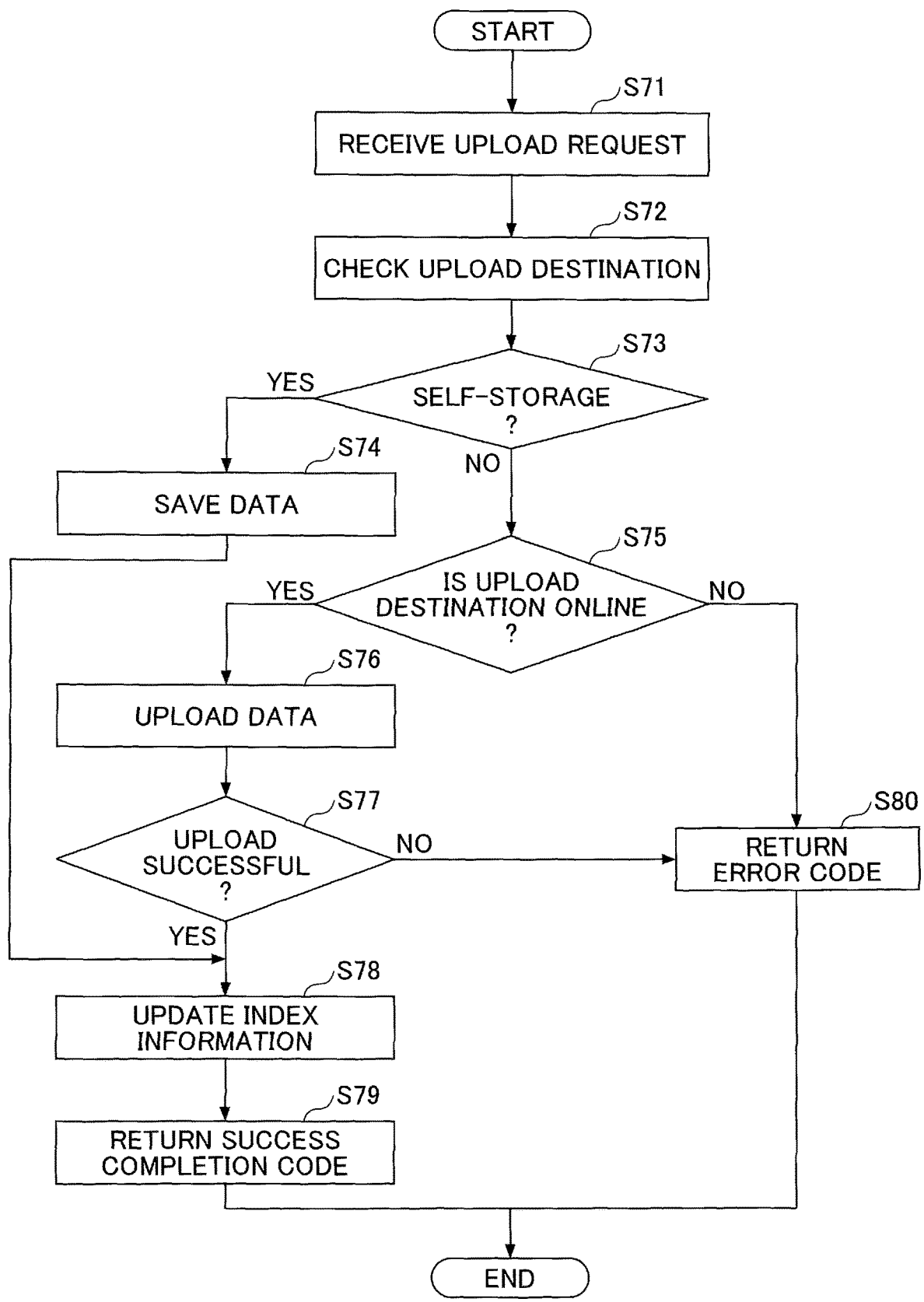
FIG. 14 is a flowchart of an example of upload processing procedures of the storage server according to the present embodiment.

FIG. 14 is a flowchart of an example of upload processing procedures of the storage server 10A according to the present embodiment. In step S71, the storage server 10A receives a data upload request from the client device 20. In step S72, the storage server 10A checks the upload destination of the data specified by the user.

Furthermore, in step S73, the storage server 10A determines whether the upload destination of the data is the self-storage. When the upload destination of the data is the self-storage, in step S74, the storage server 10A saves the data specified by the user in the file data saving unit 17.

Meanwhile, when the upload destination of the data is not the self-storage, in step S75, the storage server 10A determines whether the cloud storage 30 that is the upload destination of the data is online. When the cloud storage 30 that is the upload destination of the data is online, in step S76, the storage server 10A requests the uploading of the data specified by the user.

In step S77, when the uploading of the data in step S76 is determined as being successful, in step S78, the storage server 10A updates the index information. Note that also after saving the data specified by the user in the file data saving unit 17 in step S74, the storage server 10A performs the process of step S78. After step S78, the process proceeds to step S79, and the storage server 10A returns the success completion code to the client device 20.

Note that when the cloud storage 30 that is the upload destination of the data is not online in step S75, or when the uploading of the data is determined as not being successful in step S77, the storage server 10A performs the process of FIG. S80. In step S80, the storage server 10A returns an unsuccessful error code to the client device 20.

Figure 15:
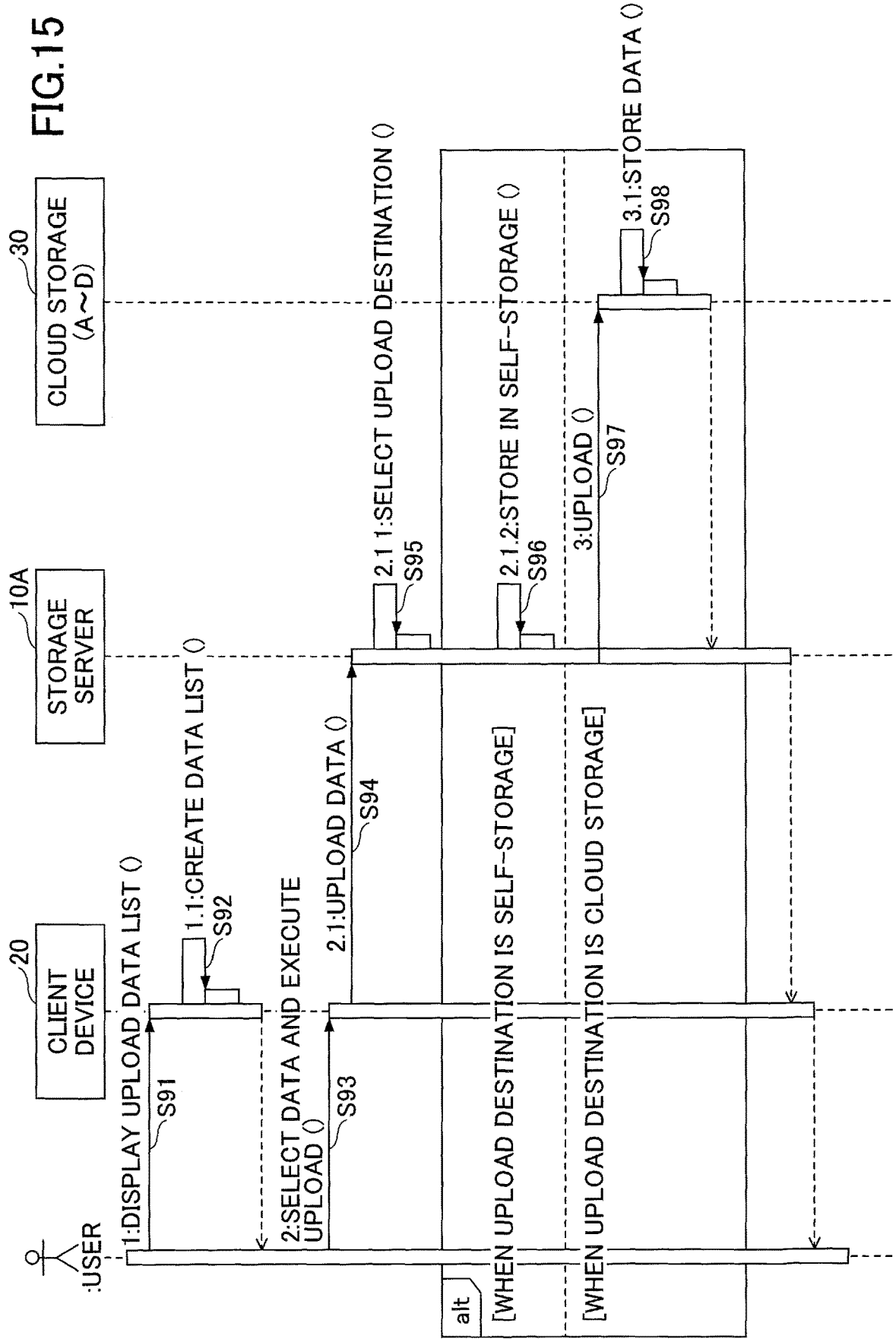
FIG. 15 is sequence diagram of another example of upload processing procedures of the information processing system according to the present embodiment.

The user may upload a file from the client device 20, as illustrated in FIG. 15. FIG. 15 is sequence diagram of another example of upload processing procedures of the information processing system 1 according to the present embodiment. Note that FIG. 15 illustrates an upload process in which the upload destination is automatically selected.

In step S91, the user operates the client device 20, and requests the display of an upload data selection screen. In step S92, the client device 20 creates a list of data that can be uploaded, and displays the data list. In step S93, the user selects data to be uploaded, from the displayed data list. Furthermore, the user requests the client device 20 to execute the uploading.

In step S94, the client device 20 requests the storage server 10A to upload the data, based on the upload execution request from the user. In step S95, the storage server 10A selects the upload destination of the data.

When the upload destination is the self-storage, in step S96, the storage server 10A saves the data selected by the user in the selected upload destination. When the upload destination is the cloud storage 30, in step S97, the storage server 10A requests the cloud storage 30 that is the upload destination to upload the data selected by the user. In step S98, the cloud storage 30 saves the uploaded data. As described above, the process of the sequence diagram of FIG. 15 is different from the process of the sequence diagram of FIG. 13 in that the upload destination is automatically selected by the storage server 10A.

Figure 16:
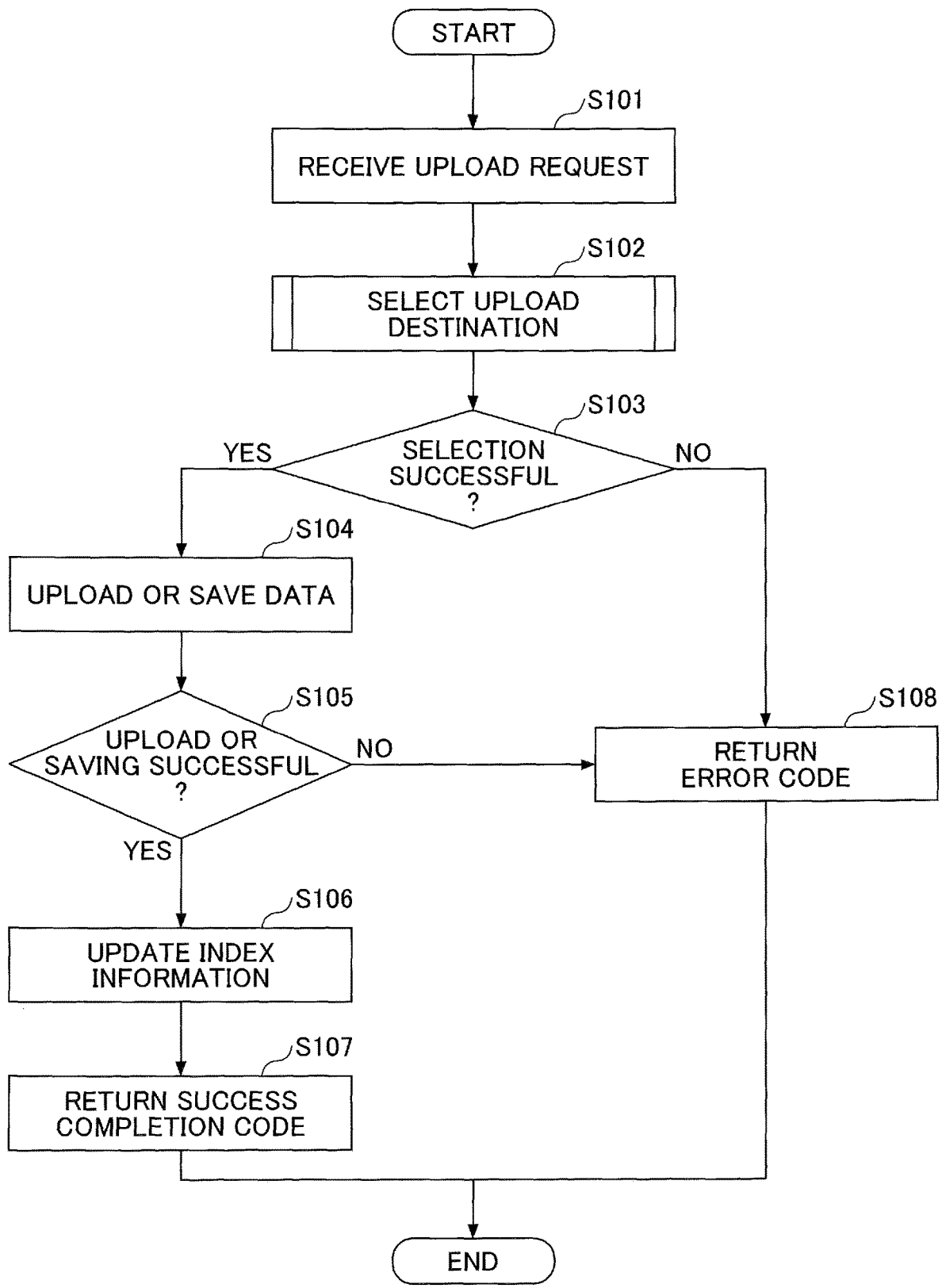
FIG. 16 is a flowchart of another example of upload processing procedures of the storage server according to the present embodiment.

FIG. 16 is a flowchart of another example of upload processing procedures of the storage server 10A according to the present embodiment. In step S101, the storage server 10A receives a data upload request from the client device 20.

In step S102, the storage server 10A selects the data upload destination of the data. In step S103, the storage server 10A determines whether the selection of the data upload destination is successful.

When the selection of the data upload destination is successful, in step S104, the storage server 10A requests the upload of the data specified by the user into the cloud storage 30, or to save the data specified by the user in the self-storage. In step S105, when the storage server 10A determines that the uploading or the saving of the data in step S104 is successful, in step S106, the storage server 10A updates the index information. In step S107, the storage server 10A returns a success completion code to the client device 20. Note that when the selection of the data upload destination is unsuccessful in step S103, or when the uploading or the saving of the data is unsuccessful in step S105, the storage server 10A performs the process of step S108. In step S108, the storage server 10A returns an unsuccessful error code to the client device 20.

Figure 17:
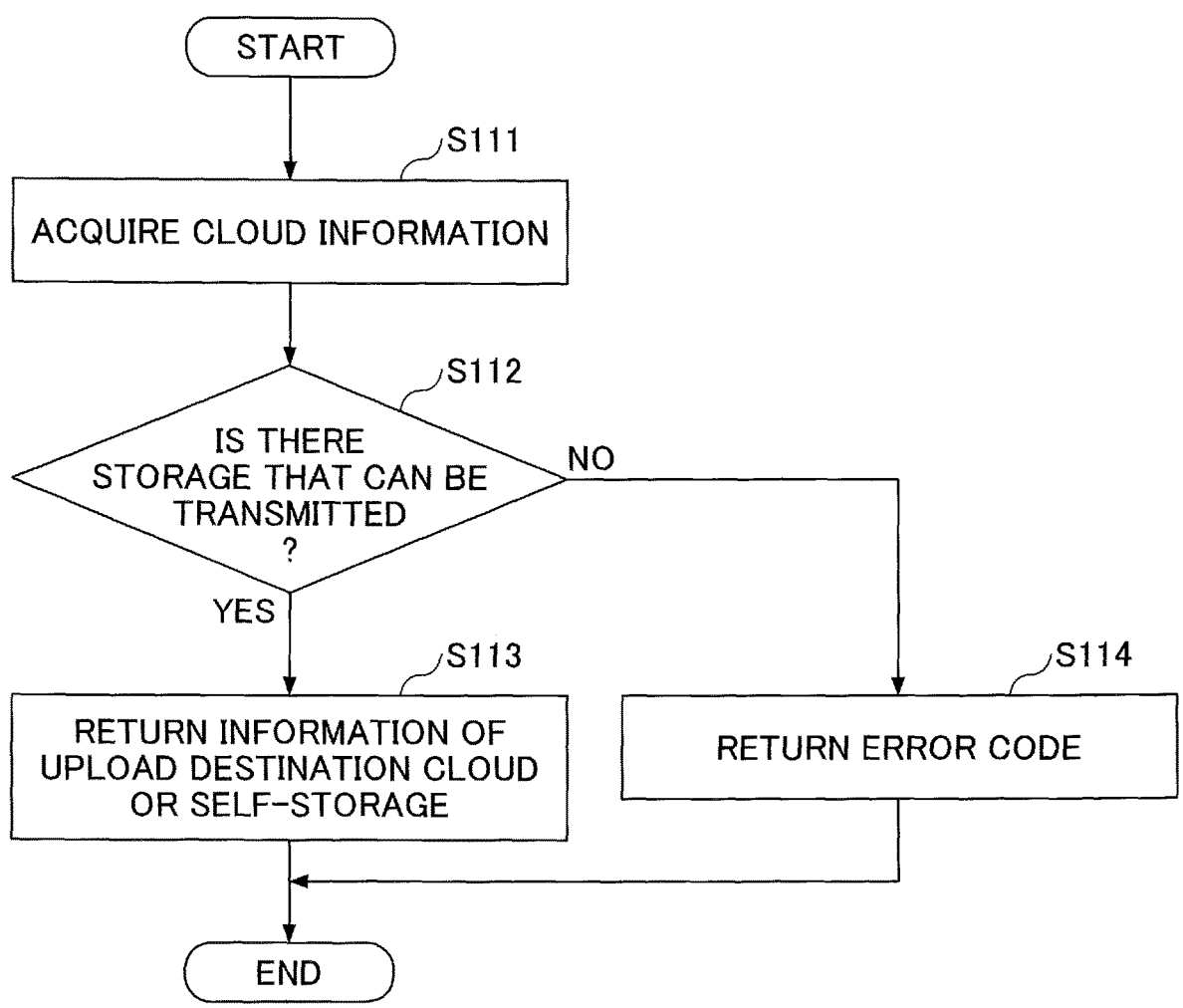
FIG. 17 is a flowchart of an example of processing procedures of selecting the data upload destination.

The process of selecting the data upload destination in step S102 is performed as illustrated in FIG. 17, for example. FIG. 17 is a flowchart of an example of processing procedures of selecting the data upload destination.

In step S111, the storage server 10A acquires the cloud information described below, which is saved in the cloud information saving unit 16. The cloud information includes at least information of the state expressing whether the cloud storage 30 is online.

In step S112, the storage server 10A determines whether there is a self-storage or a cloud storage 30 whose state is online and capable of transmission. When there is a self-storage or a cloud storage 30 capable of transmission, in step S113, the storage server 10A selects, as the data upload destination, the information of the self-storage or the cloud storage 30 having the highest priority, among the a self-storage or a cloud storage 30 capable of transmission. Then, the storage server 10A returns the information of the selected data upload destination. Note that in step S112, when there is no self-storage or cloud storage 30 capable of transmission, the storage server 10A returns an unsuccessful error code in step S114.

FIG. 18 is a configuration diagram of an example of cloud information used when selecting the upload destination of the data according to the communication speed. In the cloud information of FIG. 18, the upload destinations are given priority according to the communication speed between the storage server 10A and the cloud storage 30, so that the storage server 10A can select the upload destination of the data. In FIG. 18, the faster the communication speed, the higher the priority.

FIG. 19 is a configuration diagram of an example of cloud information used when selecting the upload destination of the data according to the free space. In the cloud information of FIG. 19, the upload destinations are given priority according to the free space in the storage server 10A and the cloud storage 30, so that the storage server 10A can select the upload destination of the data. In FIG. 19, the larger the free space, the higher the priority.

FIG. 20 is a configuration diagram of an example of cloud information used when selecting the upload destination of the data according to a keyword included in the file name. In the cloud information of FIG. 20, the upload destinations are given priority according to the keyword, so that the storage server 10A can select the upload destination of the data.

FIG. 21 is a configuration diagram of an example of cloud information used when selecting the upload destination of the data according to the type of file. In the cloud information of FIG. 21, the upload destinations are given priority according to the to the type of file, so that the storage server 10A can select the upload destination of the data. The cloud information in FIGS. 18 through 21 are examples; the upload destinations of data may be given priority according to the time period.

Downloading File

Figure 22:
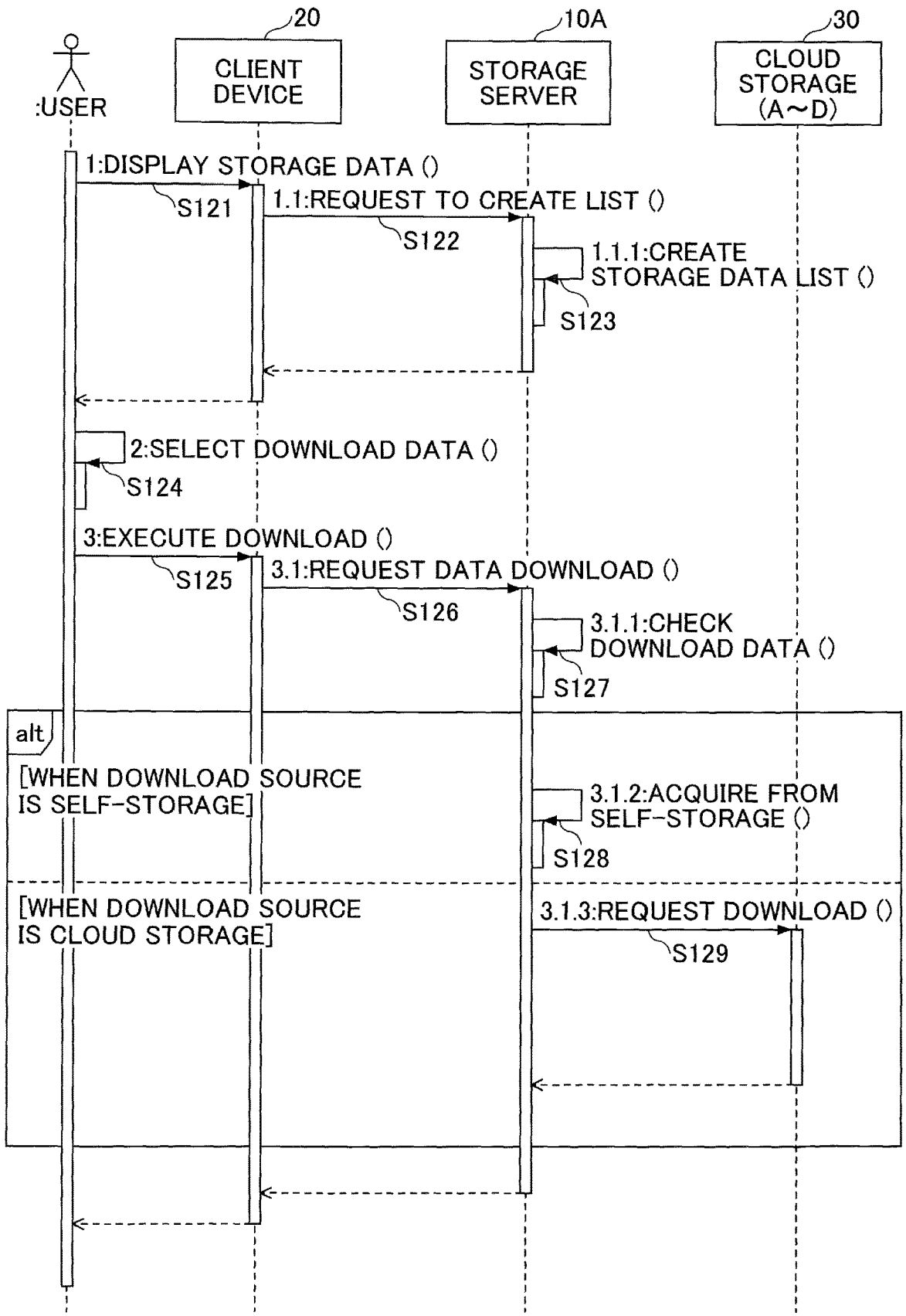
FIG. 22 is a sequence diagram of an example of download processing procedures of the information processing system according to the present embodiment.

The user may download a file from the client device 20 as illustrated in FIG. 22. FIG. 22 is a sequence diagram of an example of download processing procedures of the information processing system 1 according to the present embodiment.

In step S121, the user operates the client device 20 to request the display of the storage data. In step S122, the client device 20 requests the storage server 10A to create a list of storage data. In step S123, the storage server 10A performs a process of creating a list of storage data. Note that the storage server 10A may create the storage data list from the index information. The storage server 10A returns the created storage data list to the client device 20.

The client device 20 displays the received storage data list. The user can confirm the storage data list displayed by the client device 20. In step S124, the user selects data to be downloaded, from the storage data list. In step S125, the user requests the client device 20 to execute the downloading.

In step S126, the client device 20 requests the storage server 10A to perform the data downloading, based on the request to execute downloading from the user. In step S127, the storage server 10A checks the download source.

When the download source is the self-storage, in step S128, the storage server 10A acquires the data selected by the user from the file data saving unit 17, and sends the data to the client device 20. Furthermore, when the download source is the cloud storage 30, in step S129, the storage server 10A requests the cloud storage 30 that is the download source to download the data selected by the user.

The cloud storage 30 sends the data that has been requested to be downloaded, to the storage server 10A. The storage server 10A sends the data, which has been received from the cloud storage 30, to the client device 20.

Note that after the downloading of the data is completed, the storage server 10A can update the index information of the file stored in the cloud storage 30 that is the download source. As described above, the storage server 10A can update the index information at the timing of downloading the file.

Note that the sequence diagram of FIG. 22 indicates an example of a process of downloading the data in the client device 20 that is the request source of data downloading. For example, the sequence diagram of FIG. 23 indicates an example of a process of downloading the data in a client device 20B other than a client device 20A that is the request source of data downloading.

Figure 23:
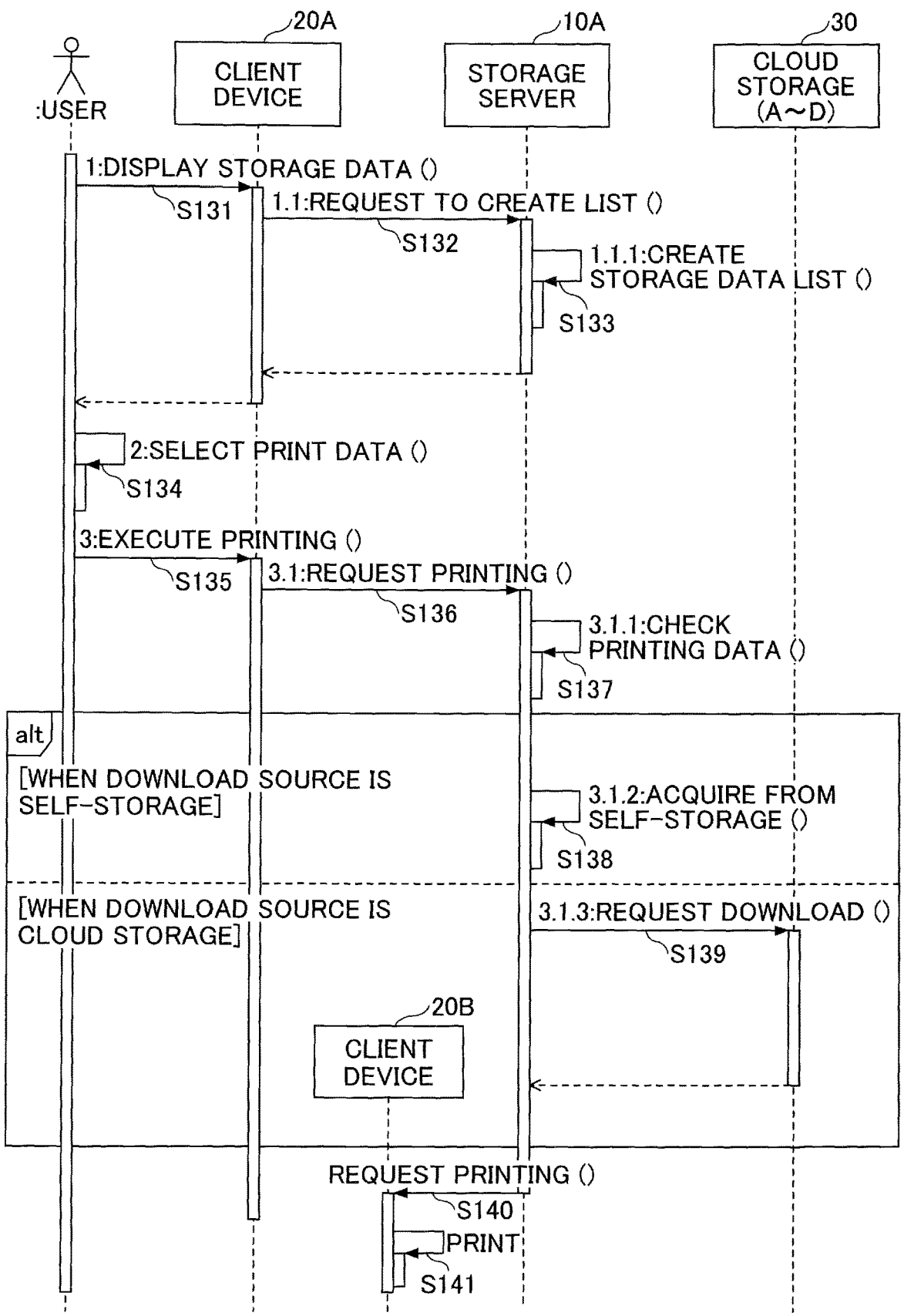
FIG. 23 is a sequence diagram of another example of download processing procedures of the information processing system according to the present embodiment.

FIG. 23 is a sequence diagram of another example of download processing procedures of the information processing system 1 according to the present embodiment. In step S131, the user operates the client device 20A to request the display of the storage data.

In step S132, the client device 20A requests the storage server 10A to create a list of storage data. In step S133, the storage server 10A performs a process of creating a list of storage data. Note that the storage server 10A may create the storage data list from the index information. The storage server 10A returns the created storage data list to the client device 20A.

The client device 20A displays the received storage data list. The user can confirm the storage data list displayed by the client device 20A. In step S134, the user selects data to be printed, from the storage data list. In step S135, the user requests the client device 20A to execute the printing.

In step S136, the client device 20A requests the storage server 10A to perform the printing, based on the request to execute printing from the user. In step S137, the storage server 10A checks the download source of the data to be printed.

When the download source is the self-storage, in step S138, the storage server 10A acquires the data selected by the user from the file data saving unit 17. When the download source is the cloud storage 30, in step S139, the storage server 10A requests the cloud storage 30 that is the download source to download the data selected by the user. Then, the storage server 10A acquires the data selected by the user from the cloud storage 30.

When the storage server 10A acquires the data selected by the user, in step S140, the storage server 10A sends the data selected by the user to the client device 20B having a printing function, and requests the client device 20B to print the data. In step S141, the client device 20B prints the data received from the storage server 10A. In the process of the sequence diagram of FIG. 23, a plurality of client devices 20A and 20B are caused to cooperate with each other, which is the different point from the process of the sequence diagram of FIG. 22.

Figure 24:
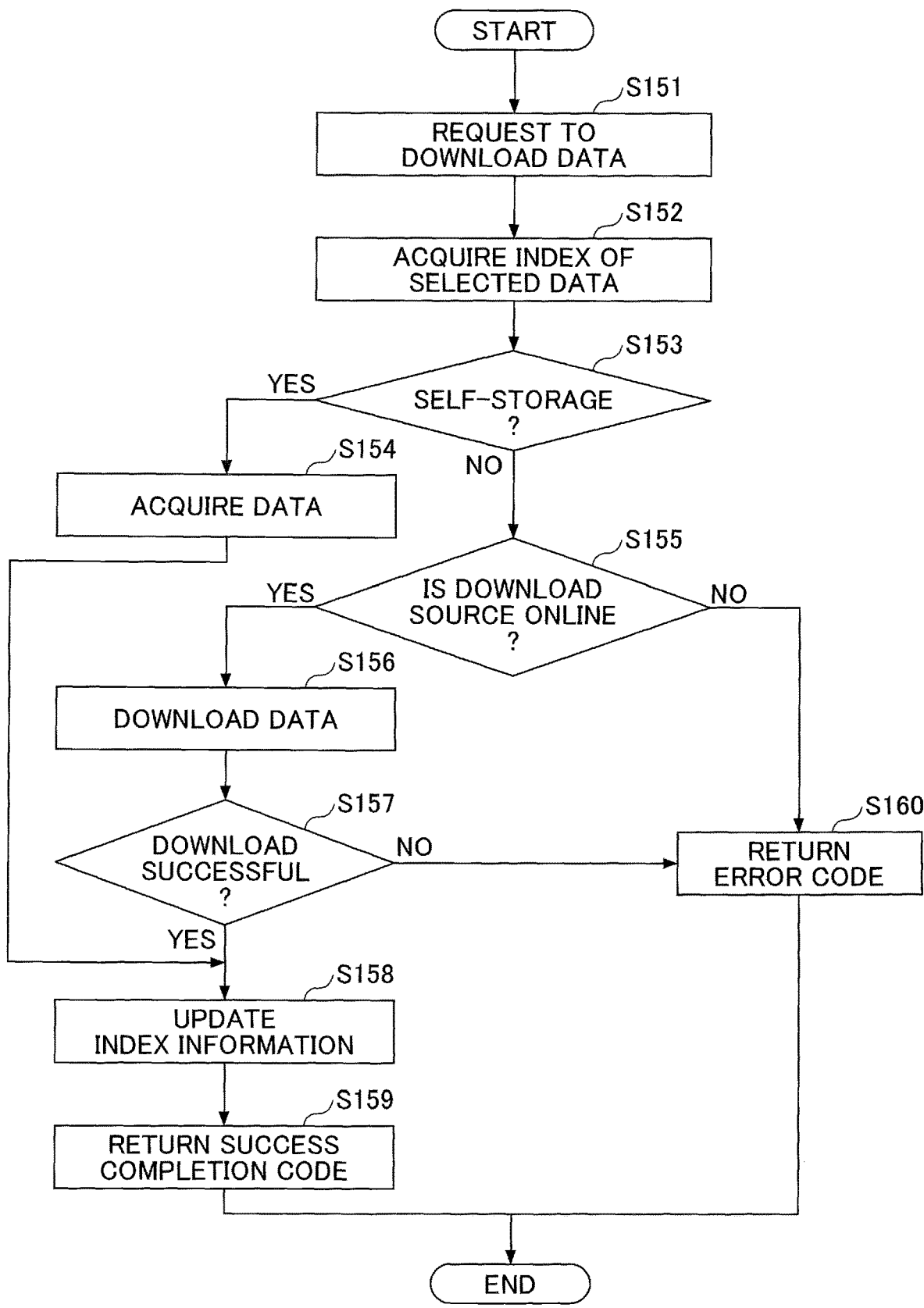
FIG. 24 is a flowchart of an example of download processing procedures of the storage server according to the present embodiment.

FIG. 24 is a flowchart of an example of download processing procedures of the storage server 10A according to the present embodiment. In step S151, the storage server 10A receives a data download request from the client device 20.

In step S152, the storage server 10A acquires the index information of the data specified by the user, and identifies whether the download source is a self-storage or the cloud storage 30, based on the index information.

In step S153, the storage server 10A determines whether the download source of the data is the self-storage. When the download source of the data is the self-storage, in step S154, the storage server 10A acquires the data specified by the user from the file data saving unit 17.

Meanwhile, when the download source of the data is not the self-storage, in step S155, the storage server 10A determines whether the cloud storage 30 that is the download source is online.

When the cloud storage 30 that is the download source is online, in step S156, the storage server 10A requests the downloading of the data specified by the user. In step S157, when the downloading of the data in step S156 is successful, in step S158, the storage server 10A updates the index information. Note that also after acquiring the data from the file data saving unit 17 in step S154, the storage server 10A performs the process of step S158. After step S158, the process proceeds to step S159, and the storage server 10A returns the success completion code to the client device 20.

Note that when the cloud storage 30 that is the download source of the data is not online in step S155, or when the downloading of the data is unsuccessful in step S157, the storage server 10A performs the process of step S160. In step S160, the storage server 10A returns an unsuccessful error code to the client device 20.

Overview

According to the information processing system 1 according to the present embodiment, when the user operates a file saved in the storage server 10A or the cloud storage 30, there is no need to perform different operations according to the save location, and the file saved in the save location can be easily operated.

Furthermore, according to the information processing system 1 according to the present embodiment, the files saved in the storage server 10A and a plurality of cloud storages 30 can be integrated in a list and displayed to the user. The user can operate the files by common procedures, regardless of the save location of the files.

Furthermore, according to the information processing system 1 according to the present embodiment, the storage server 10A can hold the index information, and therefore the data capacity required of the client device 20 can be reduced.

According to one embodiment of the present invention, an information processing device, an information management method, and an information processing system are provided, which are capable of facilitating operations on information saved in a save location.

The information processing device, the information management method, and the information processing system are not limited to the specific embodiments described herein, and variations and modifications may be made without departing from the spirit and scope of the present invention.

What is claimed is:

1. An information processing method, comprising:
storing first authentication information and second authentication information, the first authentication information being information for a user terminal device to access a first information processing device that is a first storage server, the second authentication information being information for the first information processing device to access a second information processing device that is a second storage server;
acquiring first index information from the second information processing device based on the second authentication information, wherein the first index information is information regarding a file stored in the second information processing device; and
generating, by the first information processing device, a list including the first index information, and second index information, said second index information including information regarding a file stored in the first information processing device and corresponding to the first authentication information.

2. An information processing device, comprising:
a processor configured to:
store first authentication information and second authentication information, the first authentication information being information for a user terminal device to access the information processing device that is a first storage server, the second authentication information being information for the information processing device to access a second information processing device that is a second storage server;
acquire first index information from the second information processing device based on the second authentication information, wherein the first index information is information regarding a file stored in the second information processing device; and
generate, by the information processing device, a list including the first index information, and second index information, said second index information including information regarding a file stored in the information processing device and corresponding to the first authentication information.

3. An information processing system, comprising:
a user terminal device,
a first information processing device that is a first storage server, and
a second information processing device that is a second storage server and includes a cloud storage, said first information processing apparatus comprising:
a processor configured to:
store first authentication information and second authentication information, the first authentication information being information for the user terminal device to access the first information processing device, the second authentication information being information for the first information processing device to access the second information processing device;
acquire first index information from the second information processing device based on the second authentication information, wherein the first index information is information regarding a file stored in the second information processing device; and
generate a list including the first index information, and second index information, said second index information including information regarding a file stored in the first information processing apparatus and correspond to the first authentication information.

4. The information processing method according to claim 1, further comprising:
receiving user identification information from a client device,
permitting the client device to access the first information processing device based on the first authentication information and the user identification information,
acquiring first index information from the second information processing device based on the second authentication information in association with the first authentication information corresponding to the user identification information.

5. The information processing method according to claim 1, wherein the first information processing device is connected to the second information processing device including a third information processing device and forth information processing device,
wherein the method further comprises:
storing the second authentication information including third authentication information and forth authentication information, the third authentication information being information for the first information processing device to access the third information processing device, and the fourth authentication information being information for the first information processing device to access a forth information processing device;

acquiring third index information from the third information processing device based on the third authentication information, wherein the third index information is information regarding a file stored in the third information processing device;

acquiring fourth index information from the fourth information processing device based on the fourth authentication information, wherein the fourth index information is information regarding a file stored in the fourth information processing device; and generating the list including the first index information and the second index information, wherein the first index information includes the third index information and the fourth index information.

6. The information processing method according to claim 5, wherein the method further comprises:

receiving an execution request of uploading, from a client device, the one of the files or folders that are stored in the third information processing device to the forth information processing device, and uploading, to the forth information processing device, the one or more files or the one or more folders that are stored in the third information processing device according to the third authentication information to access the third information processing device and the fourth authentication information to access the forth information processing device.

7. The information processing method according to claim 1, wherein the method further comprises:

receiving an execution request of outputting the one or more files or the one or more folders from the client device in the first information processing device, acquiring the one or more files or the one or more folders to be output from the second information processing devices according to the second authentication information, and transmitting the acquired one or more files or one or more folders to other client device from the first information processing device.

8. The method according to claim 1, further comprising generating a list including the first index info Illation indicated in a first color, and the second index information indicated in a second color different from the first color.

9. The method according to claim 1, further comprising generating a list including the first index information which has a first icon, and the second index information which has a second icon different from the first icon.

10. The information processing device according to claim 2, wherein the processor is further configured to generate a list including the first index information indicated in a first color, and the second index information indicated in a second color different from the first color.

11. The information processing device according to claim 2, wherein the processor is further configured to generate a list including the first index information which has a first icon, and the second index information which has a second icon different from the first icon.

12. The information processing device according to claim 2, wherein the processor is further configured to:

receive user identification information from a client device;

permit the client device to access the first information processing device based on the first authentication information and the user identification information;

acquire first index information from the second information processing device based on the second authentication information in association with the first authentication information corresponding to the user identification information.

13. The information processing device according to claim 3, wherein the processor is further configured to generate a list including the first index information indicated in a first color, and the second index information indicated in a second color different from the first color.

14. The information processing device according to claim 3, wherein the processor is further configured to generate a list including the first index information which has a first icon, and the second index information which has a second icon different from the first icon.

15. The information processing device according to claim 3, wherein the processor is further configured to:

receive user identification information from a client device;

permit the client device to access the first information processing device based on the first authentication information and the user identification information;

acquire first index information from the second information processing device based on the second authentication information in association with the first authentication information corresponding to the user identification information.

16. The information processing method according to claim 1, wherein the second information processing device stores the file that is accessible from the terminal device via the first information processing device.

* * * * *

UNITED STATES PATENT AND TRADEMARK OFFICE
CERTIFICATE OF CORRECTION

Page 1 of 1

PATENT NO. : 10,862,878 B2
APPLICATION NO. : 16/720352
DATED : December 8, 2020
INVENTOR(S) : Satoru Hirakata et al.

It is certified that error appears in the above-identified patent and that said Letters Patent is hereby corrected as shown below:

On the Title Page

Please correct Item (63) Related U.S. Application Data:
application No. 14/980,015, filed on Dec. 2, 2015

To:
application No. 14/980,015, filed on Dec. 28, 2015.

Signed and Sealed this
Second Day of March, 2021

Drew Hirshfeld
*Performing the Functions and Duties of the
Under Secretary of Commerce for Intellectual Property and
Director of the United States Patent and Trademark Office*